US011930333B2

(12) United States Patent
Li et al.

(10) Patent No.: US 11,930,333 B2
(45) Date of Patent: Mar. 12, 2024

(54) NOISE SUPPRESSION METHOD AND SYSTEM FOR PERSONAL SOUND AMPLIFICATION PRODUCT

(71) Applicant: BESTECHNIC (SHANGHAI) CO., LTD., Shanghai (CN)

(72) Inventors: Qian Li, Shanghai (CN); Yuan Jiang, Shanghai (CN); Xingqiang Wu, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 108 days.

(21) Appl. No.: 17/748,022

(22) Filed: May 18, 2022

(65) Prior Publication Data

US 2023/0129873 A1 Apr. 27, 2023

(30) Foreign Application Priority Data

Oct. 26, 2021 (CN) ......................... 202111249997.0
Jan. 26, 2022 (CN) ......................... 202210094944.4

(51) Int. Cl.

*H04R 3/04* (2006.01)
*G10L 21/0264* (2013.01)
*G10L 25/78* (2013.01)
*H04R 3/00* (2006.01)
*H04R 5/04* (2006.01)

(52) U.S. Cl.

CPC ............ *H04R 3/04* (2013.01); *G10L 21/0264* (2013.01); *G10L 25/78* (2013.01); *H04R 3/005* (2013.01); *H04R 5/04* (2013.01); *H04R 2410/07* (2013.01)

(58) Field of Classification Search

CPC ........ H04R 3/04; H04R 2410/07; H04R 5/04; H04R 3/005; H04R 2410/05; H04R 2410/03
USPC ............................... 381/1, 94.2, 94.7, 74, 94
See application file for complete search history.

(56) References Cited

U.S. PATENT DOCUMENTS 11,257,512 B2 * 2/2022 Nesta ..................... H04R 5/027
11,264,017 B2 * 3/2022 Masnadi-Shirazi .......................... G10L 21/0208
11,575,989 B1 * 2/2023 Li ........................... G10L 25/84
2021/0327448 A1 * 10/2021 Ji ............................ G10L 25/84
2023/0021633 A1 * 1/2023 Li ............................. H03F 1/32
2023/0081633 A1 * 3/2023 Cengarle ............. G10L 21/0208 381/56

* cited by examiner

*Primary Examiner* — Disler Paul
(74) *Attorney, Agent, or Firm* — Bayes PLLC

(57) ABSTRACT

In certain aspects, a noise suppression method and system for a personal sound amplification product (PSAP) are disclosed. An environmental audio signal acquired through one or more microphones is processed to generate a set of first sub-band signals in a set of first sub-bands. The environmental audio signal is also processed to generate a set of second sub-band signals in a set of second sub-bands. A set of first gains for the set of first sub-band signals in the set of first sub-bands is determined based on the set of second sub-band signals in the set of second sub-bands. The set of first sub-band signals is processed based on the set of first gains to generate a noise-suppressed audio signal.

20 Claims, 11 Drawing Sheets

NOISE SUPPRESSION METHOD AND SYSTEM FOR PERSONAL SOUND AMPLIFICATION PRODUCT

CROSS-REFERENCE TO RELATED APPLICATIONS

This application claims the benefit of priorities to Chinese Patent Application No. 202111249997.0, filed on Oct. 26, 2021, and Chinese Patent Application No. 202210094944.4, filed on Jan. 26, 2022, both of which are incorporated herein by reference in their entireties.

BACKGROUND

The present disclosure relates to a noise suppression method and system for a personal sound amplification product (PSAP).

In a PSAP headset, when an ambient audio signal is amplified, both a speech signal and an ambient noise signal included in the ambient audio signal are amplified at the same time. When a user wearing the PSAP headset has a need to communicate with other people nearby, the amplified ambient noise signal may affect the intelligibility of the speech signal and thus hinder the normal communication of the user with the other people.

As an example of the PSAP, an auxiliary hearing headphone (e.g., a hearing aid) may help people with hearing loss to listen to and communicate with other people more easily and participate more fully in daily activities. A conflict between noise reduction and auxiliary listening may exist in the auxiliary hearing headphone. For example, on one hand, the headphone needs to amplify and play the speech signal from the environment to the user with a low delay, where the amplification of the speech signal may also result in an undesirable amplification of the noise signal. On the other hand, the headphone needs to reduce the noise signal existing in the environment to achieve a noise reduction effect, where the suppression of the noise signal may also lead to an undesirable suppression of the speech signal. In actual use, the noise signal and the speech signal are likely to exist at the same time in the environment, which makes the noise reduction in the headphone difficult.

SUMMARY

According to one aspect of the present disclosure, a noise suppression method for a PSAP is disclosed. An environmental audio signal acquired through one or more microphones is processed to generate a set of first sub-band signals in a set of first sub-bands. The environmental audio signal is also processed to generate a set of second sub-band signals in a set of second sub-bands. A set of first gains for the set of first sub-band signals in the set of first sub-bands is determined based on the set of second sub-band signals in the set of second sub-bands. The set of first sub-band signals is processed based on the set of first gains to generate a noise-suppressed audio signal.

According to another aspect of the present disclosure, a PSAP includes one or more microphones configured to acquire an environmental audio signal, a first filter set configured to process the environmental audio signal to generate a set of first sub-band signals in a set of first sub-bands, a second filter set configured to process the environmental audio signal to generate a set of second sub-band signals in a set of second sub-bands, a processor configured to determine a set of first gains for the set of first sub-band signals in the set of first sub-bands based on the set of second sub-band signals in the set of second sub-bands, a set of gain control units configured to process the set of first sub-band signals based on the set of first gains, respectively, and a third filter set configured to synthesize the set of first sub-band signals to generate a noise-suppressed audio signal.

According to yet another aspect of the present disclosure, a noise suppression system for a PSAP is disclosed. The noise suppression system includes a memory storing code and a processor coupled to the memory. When the code is executed, the processor is configured to: receive a set of first sub-band signals in a set of first sub-bands; where the set of first sub-band signals is generated from an environmental audio signal acquired through one or more microphones; receive a set of second sub-band signals in a set of second sub-bands, where the set of second sub-band signals is also generated from the environmental audio signal; determine a set of first gains for the set of first sub-band signals in the set of first sub-bands based on the set of second sub-band signals in the set of second sub-bands; and provide the set of first gains to process the set of first sub-band signals so that a noise-suppressed audio signal is generated from the set of first sub-band signals.

BRIEF DESCRIPTION OF THE DRAWINGS

The accompanying drawings, which are incorporated herein and form a part of the specification, illustrate aspects of the present disclosure and; together with the description, further serve to explain the principles of the present disclosure and to enable a person skilled in the pertinent art to make and use the present disclosure.

Figure 1:
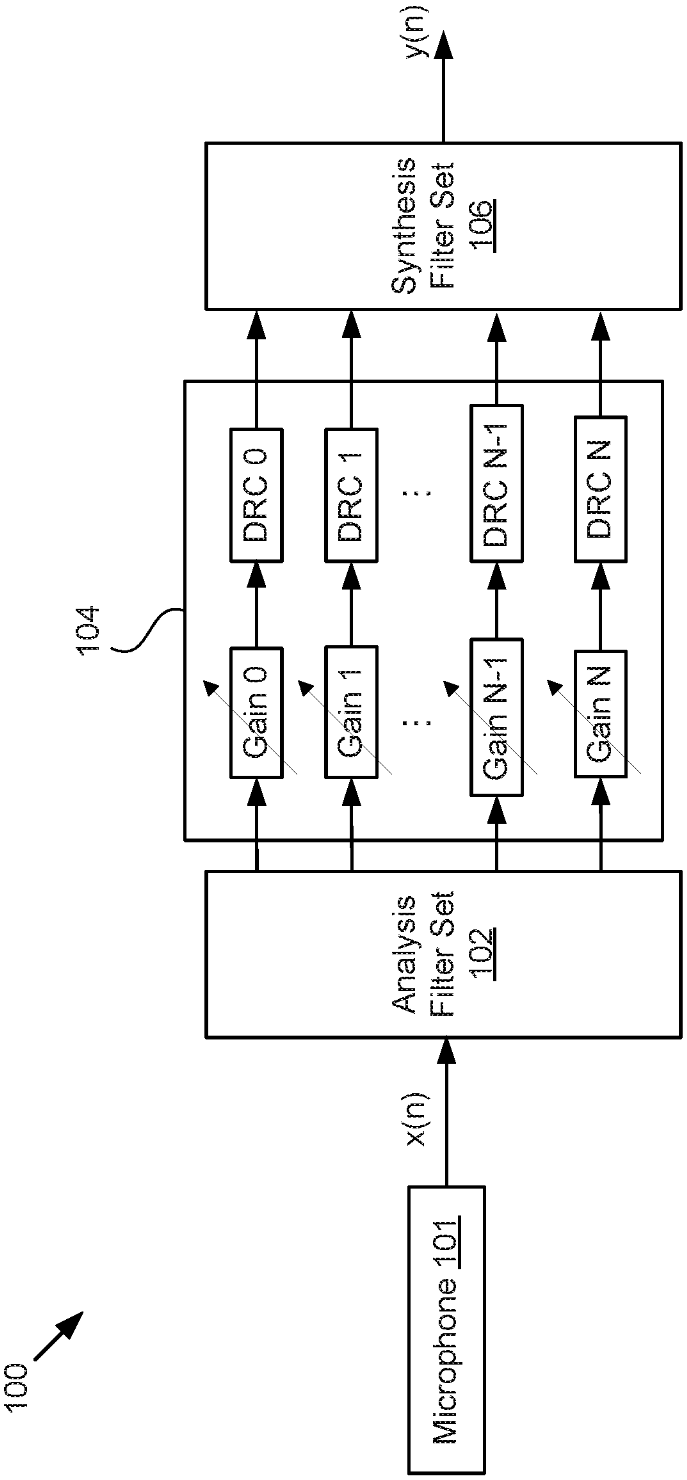
FIG. 1 illustrates a block diagram of an exemplary PSAP, according to some examples.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage; depending at least in part upon context. In addition, the term "based on" may be understood as not necessarily intended to convey an exclusive set of factors and may, instead, allow for existence of additional factors not necessarily expressly described, again, depending at least in part on context.

In some application scenarios of a PSAP headphone, if noise reduction is not performed in the headphone, a user wearing the headphone may have difficulty communicating because the environmental noise is too loud. For example, wind noise is a type of external noise that can interfere with a user's listening experience with the auxiliary hearing headphone. The wind speed may change rapidly, and the amplitude of the wind noise at a microphone of the headphone can be large. When the user with hearing loss communicates through the headphone, the intelligibility of the voice is affected by the external wind noise, which may hinder normal communication with other people. Since the wind noise is a random signal with no fixed phase, traditional active noise reduction processing methods may fail to reduce the wind noise effectively. In some technologies, a structure of the headphone may be adjusted in order to reduce the wind noise, such as adding a windproof net, adjusting the position of the microphone, etc. However, this type of structural adjustment is very limited in reducing the wind noise and cannot achieve a desired noise reduction effect. It may also increase the earphone cavity of the headphone or increase the cost of the headphone, which makes the performance of this structure adjustment unsatisfactory.

Also, it is desirable for the PSAP headphone to implement hearing aid with low latency and reduced noise interference. For example; a noise reduction module may be added before (or within) a PSAP hardware path, and then an output signal from the noise reduction module can be sent back to the PSAP hardware path after the noise reduction processing. However, on one hand, the addition of the noise reduction module may increase the path delay greatly and affect the naturalness of the hearing aid. On the other hand; if the noise reduction is not performed, the user of the PSAP headphone may feel that the ambient noise is too loud, and the normal communication with other people can be interrupted by the ambient noise.

Consistent with the present disclosure, a noise suppression method and system disclosed herein can estimate external noise from an external audio signal in real time (or near real time) at a low sampling rate, analyze the noise distribution and/or speech presence probabilities in second sub-bands with a low sampling rate, and determine gains of the second sub-bands with the low sampling rate as well as gains of first sub-bands with a high sampling rate, so as to control (or suppress) the noise on the PSAP hardware path at the high sampling rate in real time (or near real time). By reducing or suppressing the external noise, the user experience of the PSAP headphone can be improved in different scenarios.

For example, a hardware path of the PSAP headphone can be a high sampling path with low processing latency. The method and system disclosed herein provide a software path which is a downsampling path with a lower sampling rate and a noise estimation function. Processing delay of the software path can be higher than that of the hardware path. However, by reducing the sampling rate in the software path, the processing complexity of the software path can be reduced. By combining the hardware path with the software path, noise suppression can be achieved with low latency in the PSAP headphone because no noise reduction module needs to be introduced into the hardware path. For example, the method and system disclosed herein can obtain the effect of low delay even when the hardware path is at a relatively high sampling rate, thereby overcoming the defect of high delay and complexity caused by the noise reduction module.

In the method and system disclosed herein, first gains of first sub-bands processed by the hardware path can be determined based on second gains of second sub-bands processed by the software path, where the second gains of the second sub-bands can be determined based on speech presence probabilities of the second sub-bands. For a second sub-band with a zero speech presence probability (or the speech presence probability being smaller than a threshold), a second gain for the second sub-band can be zero, so that noise present in the second sub-band can be filtered out. Thus, noise reduction can be achieved through the gains of the different sub-bands in the process of signal processing.

Consistent with the present disclosure, the method and system disclosed herein may detect whether wind noise is present in the environment through a relevance factor. If the wind noise is present, the method and system disclosed herein may determine a level of wind noise or a wind noise suppression factor, and perform wind noise suppression based on the level of wind noise or the wind noise suppression factor. In this way, effective noise reduction processing can be performed to reduce the wind noise that appears as a random signal and has no fixed phase. Thus, a user's listening experience and speaking experience through the PSAP headphone can be improved.

FIG. 1 illustrates a block diagram of an exemplary PSAP 100, according to some examples. PSAP 100 may include a microphone 101, an analysis filter set 102, a gain control set 104, and a synthesis filter set 106. Gain control set 104 may include a set of gain control units, with each gain control unit including a multiplier (e.g., Gain 0, Gain 1, . . . , Gain N−1, or Gain N) and a dynamic range controller (e.g., DRC 0, DRC 1, . . . , DRC N−1, or DRC N).

In some implementations, microphone 101 may be an external microphone mounted on PSAP 100 and configured to generate an environmental audio signal x(n) based on acoustic signals present in the environment. The environmental audio signal may include a speech signal present in the environment, an environmental noise signal (e.g., a wind noise signal or any other external noise signal), or a mixture of the speech signal and the environmental noise signal.

Analysis filter set 102 may include a Fourier transformer and a set of filters, and configured to process the environmental audio signal x(n) acquired by microphone 101. Analysis filter set 102 may process the environmental audio signal x(n) to generate a set of first sub-band signals in a set of first sub-bands. For example, analysis filter set 102 may transform the environmental audio signal x(n) into a frequency domain using the Fourier transformer, and divide the transformed environmental audio signal in the frequency domain into a set of first sub-band signals in a set of first sub-bands using the set of filters.

Each first sub-band signal may be processed by a gain control unit. For example, a multiplier of the gain control unit may multiply the first sub-band signal with a first gain configured for the first sub-band signal, and a dynamic range controller of the gain control unit may adaptively adjust a dynamic range of the first sub-band signal. After processing the first sub-band signal, the gain control unit may output the first sub-band signal to synthesis filter set 106. By performing similar operations, the set of gain control units in gain control set 104 may process the set of first sub-band signals using a set of first gains, respectively, and output the set of first sub-band signals to synthesis filter set 106. Synthesis filter set 106 may include one or more filters, and may be configured to process and combine the set of first sub-band signals to generate an output signal y(n).

In some implementations, microphone 101, analysis filter set 102, gain control set 104, and synthesis filter set 106 are implemented using hardware and form a hardware path of PSAP 100. However, it can be difficult to implement a noise reduction module directly on the hardware path to achieve a noise suppression effect. This is because the noise reduction module has high calculation complexity and a large circuit scale, which makes it difficult to implement the functionality of the noise reduction module using hardware directly. Further, the addition of the noise reduction module to the hardware path may result in an introduction of a data buffer structure into the hardware path, which may cause extra processing delay in the hardware path. The processing delay may affect the user experience of PSAP 100, so that PSAP 100 with the extra processing delay cannot be used in scenarios with low delay requirements.

To address at least one of the above issues, a noise suppression method and system are disclosed herein to suppress noise wind noise or any other type of external noise) existing in an environmental audio signal and to generate a noise-suppressed audio signal for a PSAP, so that the user experience of the PSAP can be improved with reduced noise effect and low delay. Specifically, the method and system disclosed herein can estimate environmental noise in real time or near real time, and analyze a distribution of the environmental noise (or distribution of speech presence) in a downsampling software path of the environmental audio signal. As a result, the environmental audio signal in a high sampling hardware path can be processed based on a processing result from the downsampling software path to reduce the noise with low delay. By combining the high sampling hardware path having low processing delay with the downsampling software path, noise suppression can be achieved in the PSAP with low latency.

For example, the environmental audio signal in the high sampling hardware path can be divided into a set of first sub-band signals, and the downsampled environmental audio signal in the downsampling software path can be divided into a set of second sub-band signals. First gains for the first sub-band signals in the high sampling hardware path can be determined based on the set of second sub-band signals in the downsampling software path. As a result, noise present in the environmental audio signal in the high sampling hardware path can be suppressed to generate a noise-suppressed audio signal for the PSAP to play. As a result, the PSAP can be applied in different scenarios with improved user experience (e.g., reduced noise effect, low delay, etc.).

Consistent with the present disclosure, the method and system disclosed herein can reduce wind noise present in the environmental audio signal. For example, the method and system disclosed herein can determine whether wind noise is present in the environmental audio signal. If the wind noise is present, the method and system disclosed herein may determine a composite wind noise indicator associated with the wind noise, determine a level of wind noise based on the composite wind noise indicator, and suppress the wind noise to generate a noise-suppressed audio signal based on the level of wind noise. The method and system disclosed herein can accurately detect whether the wind noise is present in the environment. If the wind noise is present, the method and system disclosed herein can suppress the wind noise in the PSAP, so that a speech play performance of the PSAP can be improved with reduced noise and the user experience of the PSAP can be enhanced.

Figure 2:
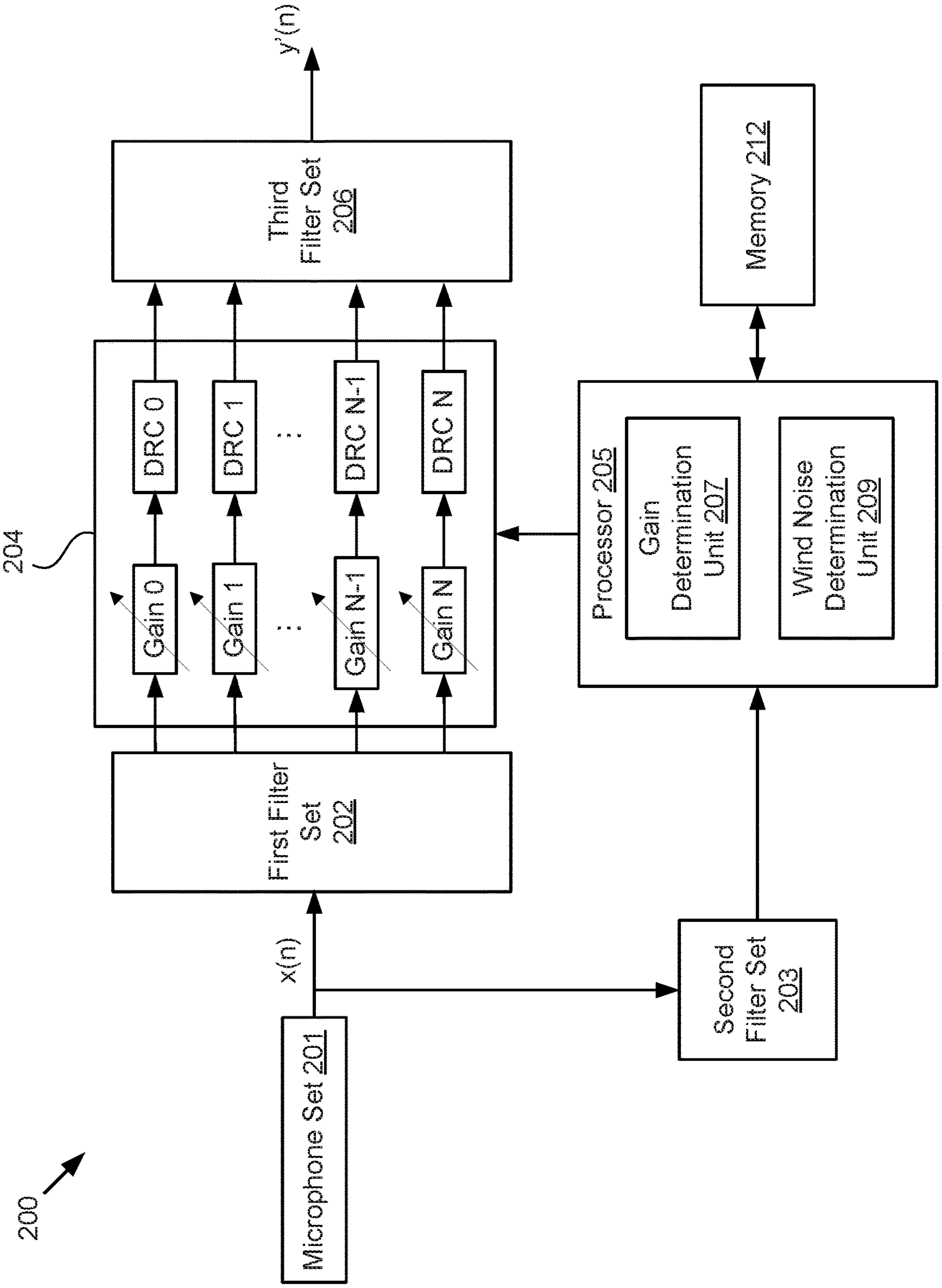
FIG. 2 illustrates a block diagram of an exemplary PSAP with noise suppression, according to some aspects of the present disclosure.

FIG. 2 illustrates a block diagram of an exemplary PSAP 200 with noise suppression, according to some aspects of the present disclosure. PSAP 200 may include a microphone set 201, a first filter set 202, a second filter set 203, a gain control set 204, a processor 205, a memory 212 coupled to processor 205, and a third filter set 206. It is contemplated that PSAP 200 may include any other component of a PSAP, such as a speaker, which is not shown in the figure.

A hardware path (or a hardware loop) of PSAP 200 may include microphone set 201, first filter set 202, gain control set 204, and third filter set 206, which can be implemented using hardware. A software path of PSAP 200 may include second filter set 203, a gain determination unit 207, and a wind noise determination unit 209, which can be implemented using software. The hardware path can be a high sampling path with low processing latency, the software path can be a downsampling path with a lower sampling rate and a noise estimation function. Processing delay of the software path can be higher than that of the hardware path. However, by, reducing the sampling rate in the software path, the processing delay of the software path can also be reduced. By combining the hardware path having low processing delay with the software path, noise suppression can be achieved in PSAP 200 with low latency.

Microphone set 201 may include one or more external microphones (e.g., microphone 101 shown in FIG. 1) mounted on PSAP 200. For example, microphone set 201 may include one or more feedforward microphones. Microphone set 201 may be configured to acquire an environmental audio signal x(n) based on acoustic signals present in the environment. The environmental audio signal may include a speech signal present in the environment, an environmental noise signal (e.g., a wind noise signal or any other external noise signal), or a combination of the speech signal and the environmental noise signal.

First filter set 202 may include a Fourier transformer and one or more filters, and configured to process the environmental audio signal x(n) acquired by microphone set 201. For example, first filter set 202 may be an analysis filter set in the hardware path of PSAP 200. First filter set 202 may process the environmental audio signal x(n) to generate a set of first sub-band signals in a set of first sub-bands. For example, first filter set 202 may transform the environmental audio signal x(n) into a frequency domain using the Fourier transformer, and divide the transformed environmental audio signal in the frequency domain into a set of first sub-band signals in a set of first sub-bands using the one or more filters.

Second filter set 203 may include one or more downsampling filters and one or more Fourier transformers (e.g., as described below in more detail with reference to FIGS. 3B-3C), and may be configured to process the environmental audio signal x(n) acquired by microphone set 201 to generate a set of second sub-band signals in a set of second sub-bands. For example, second filter set 203 may downsample the environmental audio signal, transform the downsampled environmental audio signal into the frequency domain using Fourier transform (e.g., fast Fourier transform (FFT)), and then divide the downsampled and transformed environmental audio signal into a set of second sub-band signals in a set of second sub-bands, respectively.

In some implementations, the downsampling of the environmental audio signal and the transformation of the downsampled environmental audio signal into the frequency domain can be achieved using a software program stored in memory 212 and executed by processor 205. In some implementations, a frequency interval between each two adjacent second sub-bands may be smaller than or equal to a frequency interval between each two adjacent first sub-bands. In this case, all the second sub-bands can be mapped into corresponding first sub-bands as described below in more detail, so that components of the environmental audio signal in different frequency bands can be kept during the processing of the environmental audio signal to ensure completeness of the environmental audio signal during the processing.

In some implementations, processor 205 may include several modules, such as gain determination unit 207 and wind noise determination unit 209. Gain determination unit 207 may be configured to determine a set of first gains for the set of first sub-band signals in the set of first sub-bands based on the set of second sub-band signals. In some implementations, wind noise determination unit 209 may be configured to determine at least one of a level of wind noise based on the environmental audio signal or a wind noise suppression factor based on the level of wind noise. Gain determination unit 207 may determine the set of first gains for the set of first sub-band signals further based on the level of wind noise. Or, gain determination unit 207 may adjust the set of first gains for the set of first sub-band signals based on the wind noise suppression factor.

Although FIG. 2 shows that gain determination unit 207 and wind noise determination unit 209 are within one processor 205, they may be likely implemented on different processors located closely or remotely with each other. Gain determination unit 207 and wind noise determination unit 209 (and any corresponding sub-modules or sub-units) can be hardware units (e.g., portions of an integrated circuit) of processor 205 designed for use with other components or software units implemented by processor 205 through executing at least part of a program. The program may be stored on a computer-readable medium, such as memory 212, and when executed by processor 205, it may perform one or more functions disclosed herein.

To begin with, gain determination unit 207 may determine a set of speech presence probabilities associated with the set of second sub-band signals in the set of second sub-bands, respectively. For example, for each second sub-band, gain determination unit 207 may determine a speech presence probability for the second sub-band, so that a set of speech presence probabilities can be determined for the set of second sub-bands. The set of speech presence probabilities may include a set of posterior speech presence probabilities associated with the set of second sub-band signals.

For example, for each second sub-band signal in a corresponding second sub-band, gain determination unit 207 may determine a prior speech presence probability and a prior signal-to-noise ratio (SNR) associated with the second sub-band signal. Gain determination unit 207 may determine an intermediate variable based on the prior speech presence probability and the prior SNR. Then, gain determination unit 207 may determine a posterior speech presence probability associated with the second sub-band signal based on the prior speech presence probability, the prior SNR, and the intermediate variable. As a result, the posterior speech presence probability may increase as the prior SNR or the intermediate variable increases.

For example, the posterior speech presence probability of the second sub-band signal may satisfy the following equation (1):

$$p(k) = \left\{1 + \frac{q(k)}{1 - q(k)}(1 + \xi(k))\exp(-\upsilon(k))\right\}^{-1}. \tag{1}$$

In the above equation, k denotes the second sub-band in the frequency domain, p(k) denotes the posterior speech presence probability in the second sub-band k, and q(k) denotes the prior speech presence probability, which is usually 0.5. ξ(k) denotes the prior SNR of the second sub-band k, and ν(k) denotes the intermediate variable.

In some implementations, the intermediate variable increases as the prior SNR (or a posterior SNR) increases. For example, $\nu(k)=\gamma(k)\xi(k)/(\xi(k)+1)$, where γ(k) denotes the posterior SNR. $\xi(k)=\alpha_p G^2(k, l-1)|Y(k, l-1)|^2+(1) \max\{\gamma(k,l)-1,0\}$, where l denotes a current frame, l−1 denotes a previous frame, and $\alpha_p$ denotes a constant between 0 and 1.

$$\gamma(k) = \frac{|Y(k)|^2}{\lambda(k)},$$

where $|Y(k)|^2$ denotes a signal power of the second sub-band signal in the second sub-band k, and λ(k) denotes a noise power in the second sub-band k.

An exemplary iterative calculation of the noise power λ(k) satisfies:

$$\Delta(k,l)=\alpha_{pow}\lambda(k,l-1)+(1-\alpha_{pow})(1-p(k))|Y(k,l)|^2 \tag{2}.$$

In the above equation (2), $\alpha_{pow}$ denotes a constant between 0 and 1, l denotes the current frame, and l−1 denotes the previous frame.

Next, gain determination unit 207 may determine a set of second gains in the set of second sub-bands based on the set of speech presence probabilities, respectively. For example, for a second sub-band with a zero speech presence probability, gain determination unit 207 may determine a second gain for the second sub-band to be zero, so that noise present in the second sub-band can be eliminated directly. For other second sub-bands with non-zero speech presence probabilities, gain determination unit 207 may determine second gains for the other second sub-bands based on values of the speech presence probabilities. By setting the second gains through this manner, speech components present in second sub-bands with high speech presence probabilities can be emphasized while noise components in second sub-bands with zero or low speech presence probabilities can be removed or reduced, so that a noise reduction effect can be achieved.

For example, for each second sub-band, gain determination unit 207 may determine a second gain for the second sub-band based on (a) the posterior speech presence probability, associated with the second sub-band, (b) an intermediate spectral gain, and (c) a gain lower limit when no speech is present. As a result, the determined second gain can increase when the posterior speech presence probability and/or the intermediate spectral gain increase. For example, the second gain G(k) in the second sub-band k satisfies:

$$G(k) = \left[p(k)G_{H_1}^{\alpha}(k) + (1 - p(k))G_{min}^{\alpha}\right]^{\frac{1}{\alpha}}. \tag{3}$$

In the above equation (3), $G_{min}$ denotes a constant, indicating the gain lower limit for noise reduction when speech does not exist in the second sub-band, where the minimum value of $G_{min}$ is 0. α denotes a constant usually taking the value of ½. $G_{H_1}(k)$ denotes the intermediate spectral gain, which satisfies:

$$G_{H_1}(k) = \frac{\sqrt{\upsilon(k)}}{\gamma(k)}\left[\Gamma\left(1 + \frac{\alpha}{2}\right)M\left(-\frac{\alpha}{2}; 1; -\upsilon(k)\right)\right]^{\frac{1}{\alpha}} \tag{4}$$

In the above equation (4), $$\Gamma\left(1 + \frac{\alpha}{2}\right)$$

denotes the Chi-square distribution function, and $$M\left(-\frac{\alpha}{2}; 1; -\upsilon(k)\right)$$

denotes the confluent hypergeometric function.

The above-mentioned gain calculation method for noise reduction (e.g., equations (3), (4)) is only an example implementation of the gain calculation. Oilier gain calculation methods for noise reduction can also be obtained by using various single-channel or multi-channel microphone noise reduction schemes, such as a single-channel-based deep neural network (DNN) method, an optimally-modified log-spectral amplitude (OMLSA) method, a minimum mean square estimator (MMSE) noise reduction method based on stationary noise estimation, a multi-channel based minimum variance distortionless response (MVDR) or DNN method.

Subsequently, gain determination unit 207 may determine the set of first gains in the set of first sub-bands based on the set of second gains in the set of second sub-bands. Specifically, for each first sub-band, gain determination unit 207 may determine, from the set of second sub-bands, one or more second sub-bands included within the first sub-band. Gain determination unit 207 may determine one or more second gains in the one or more second sub-bands from the set of second gains, respectively. Gain determination unit 207 may determine a first gain in the first sub-band based on the one or more second gains.

By way of examples, the set of first sub-bands divided by first filter set 202 in the hardware path of PSAP 200 may include 500 Hz, 1000 Hz, 2000 Hz, 4000 Hz, and 8000 Hz, with first gains denoted as G'0, G'1, G'2, G'3, and G'4, respectively. The set of second sub-bands divided by second filter set 203 in the software path of the PSAP 200 may include 125 Hz, 250 Hz, 375 Hz, 500 Hz, 625 Hz, 750 Hz, 875 Hz, 1000 Hz, 1125 Hz, 1250 Hz, . . . , 8000 Hz, with second gains denoted as G0, G1, G2, . . . , G63, respectively. Gain determination unit 207 may determine a correspondence between the set of first sub-bands and the set of second sub-bands, so that respective second sub-bands included in each first sub-band can be determined. Then, for each first sub-band, a first gain of the first sub-band can be determined based on second gains of the respective second sub-bands included in the first sub-band.

For example, with respect to the first sub-band at 500 Hz, the second sub-bands at 125 Hz, 250 Hz, 375 Hz, and 500 Hz may correspond to the first sub-band at 500 Hz and be included in the first sub-band at 500 Hz. The first gain of the first sub-band at 500 Hz (e.g., G'0) can be determined based on second gains of the second sub-bands at 125 Hz, 250 Hz, 375 Hz, and 500 Hz (e.g., G0, G1, G2, G3). For example, G'0 can be determined to be a minimum, a median, an average, a maximum, or one of (G0, G1, G2, G3).

With respect to the first sub-band at 1000 Hz, the second sub-bands at 625 Hz, 750 Hz, 875 Hz, and 1000 Hz may correspond to the first sub-band at 1000 Hz and be included in the first sub-band at 1000 Hz. The first gain of the first sub-band at 1000 Hz (e.g., G'1) can be determined based on second gains of the second sub-bands at 625 Hz, 750 Hz, 875 Hz, and 1000 Hz (e.g., G4, G5, G6, G7). For example, G'1 can be determined to be a minimum, a median, an average, a maximum, or one of (G4, G5, G6, G7).

In some implementations, gain determination unit 207 may determine a first gain for each first sub-band to be a maximal gain among second gains of respective second sub-bands included in the first sub-band. For example, G'0=max{G0, G1, G2, G3}; G'1=max{G4, G5, G6, G7}; G'2=max{G8, G9, G10, G11, G12, G13, G14, G15}; G'3=max{G16, G17, G18, G19, . . . , G31}; and G'4=max{G32, G33; G34; G35, . . . , G63}. By selecting the maximum value among the second gains of the respective second sub-bands included in the first sub-band, the speech clarity in the first sub-band can be improved, and the environmental noise in the first sub-band can be filtered out, so as to achieve the noise reduction effect during the process of hearing assistance by PSAP 200.

In some implementations, wind noise determination unit 209 may be configured to determine a level of wind noise based on the environmental audio signal. For example, wind noise determination unit 209 may determine a composite wind noise indicator associated with the wind noise, and determine the level of wind noise based on the composite wind noise indicator. The level of wind noise may include a first wind noise level lw1, a second wind noise level lw2, and a third wind noise level lw3, with lw1>lw2>lw3. Wind noise determination unit 209 is described below in more detail with reference to FIG. 3B.

For each first sub-band, gain determination unit 207 may determine a first gain in the first sub-band based on (a) one or more second gains in one or more second sub-bands included in the first sub-band and (b) the level of wind noise. Specifically, responsive to the first sub-band being smaller than or equal to a frequency threshold (e.g., ≤2 kHz) and the level of the wind noise being smaller than a level threshold, gain determination unit 207 may determine the first gain to be a maximal gain among the one or more second gains. Responsive to the first sub-band being smaller than or equal to the frequency threshold and the level of the wind noise being equal to or greater than the level threshold, gain determination unit 207 may determine the first gain to be a minimal gain among the one or more second gains. Alternatively, responsive to the first sub-band being greater than the frequency threshold, gain determination unit 207 may determine the first gain to be one.

For example, the set of second sub-bands can include 125, 250, 375, 500, 625, 750, 875, . . . , 8000 Hz with the set of second gains to be G0, G1, G2, . . . , G63, respectively. The set of first sub-bands can include 500, 1000, 2000, 4000, and 8000 Hz with the set of first gains to be G'0, G'1, G'2, G'3, and G'4, respectively. If the level of wind noise is small (smaller than the level threshold) and the first sub-band is smaller than or equal to 2 kHz, a strategy with low wind noise suppression can be applied, so that a maximal gain among the one or more second gains can be selected as the first gain in the first sub-band. That is, G'0=max{G0, G1, G2, G3} for the first sub-band at 500 Hz, G'1=max{G4, G5, G6, G7} for the first sub-band at 1000 Hz, G'2=max{G8, G9, G10, G11, G12, G13, G14, G15} for the first sub-band at 2000 Hz, G'3=1 for the first sub-band at 4000 Hz, and G'4=1 for the first sub-band at 8000 Hz. In some implementations, the level threshold can be a predetermined wind noise level such as the second wind noise level 1*w*2 or the third wind noise level lw3.

If the level of wind noise is large (equal to or greater than the level threshold) and the first sub-band is smaller than or equal to 2 kHz, a strategy with high wind noise suppression can be applied, so that a minimal gain among the one or more second gains can be selected as the first gain in the first sub-band. That is, G'0=min{G0, G1, G2, G3} for the first sub-band at 500 Hz, G'1=min{G4, G5, G6, G7} for the first sub-band at 1000 Hz, G'2=min{G8, G9, G10, G11, G12, G13, G14, G15} for the first sub-band at 2000 Hz, G'3=1 for the first sub-band at 4000 Hz, and G'4=1 for the first sub-band at 8000 Hz. In this example, G'3=G'4=1 no matter the level of wind noise is small or large. That is, no wind noise suppression is applied to first sub-bands greater than the frequency threshold 2 kHz.

In some implementations, wind noise determination unit 209 may be configured to determine a wind noise suppression factor based on the level of wind noise. Gain determination unit 207 may adjust the set of first gains in the set of first sub-bands based on the wind noise suppression factor. For example, gain determination unit 207 may adjust first gains for first sub-bands that are not greater than the frequency threshold (e.g., the first sub-bands ≤2 kHz) based on the wind noise suppression factor, so that the wind noise within the 2 kHz range can be suppressed.

In some implementations, gain determination unit 207 may determine noise energy in high frequency sub-bands (e.g., second sub-bands higher than a predetermined frequency), and may determine a high frequency attenuation factor based on the noise energy in the high frequency sub-bands. Gain determination unit 207 may determine the set of first gains in the set of first sub-bands further based on the high frequency attenuation factor. For example, gain determination unit 207 may apply the high frequency attenuation factor to first sub-bands that are higher than the predetermined frequency.

Gain control set 204 may include a set of gain control units, with each gain control unit including a multiplier (e.g., Gain 0, Gain 1, . . . , Gain N−1, or Gain N) and a dynamic range controller (e.g., DRC 0, DRC 1, . . . , DRC N−1, or DRC N). Each first sub-band signal may be processed by a corresponding gain control unit. For example, a multiplier of the corresponding gain control unit may multiply the first sub-band signal with a first gain configured for the first sub-band signal, and a dynamic range controller of the corresponding gain control unit may adaptively adjust a dynamic range of the first sub-band signal. After processing the first sub-band signal, the corresponding gain control unit may output the first sub-band signal to third filter set 206. As a result, gain control set 204 may process the set of first sub-band signals using the set of first gains, respectively, and output the set of first sub-band signals to third filter set 206. Third filter set 206 may be a synthesis filter set including one or more filters, and be configured to process and combine the set of first sub-band signals to generate an output signal y'(n) (e.g., a noise-suppressed audio signal) for a speaker of PSAP 200 to play.

From the above description for FIG. 2, it is noted that the second gains determined in the software path can be mapped into the first gains in the PSAP hardware path, so that the noise reduction effect can be achieved in the PSAP hardware path (e.g., through the multipliers). Then, a noise-suppressed audio signal can be synthesized by third filter set 206 and output to a speaker of PSAP 200 for play.

Consistent with the present disclosure, the division of the environmental audio signal x(n) into the set of first sub-band signals, the application and control of the set of first gains to the set of first sub-band signals, the processing of DRCs, and the synthesis and generation of the noise-suppressed audio signal y'(n) are performed in the PSAP hardware path. A sampling rate of the hardware path can be equal to or greater than 96 kHz. That is, the PSAP hardware path may include microphone set 201, first filter set 202, multipliers (Gain 0, . . . , Gain N), DRCs (DRC 0, . . . , DRC N), and third filter set 206. By setting the PSAP hardware path in a high sampling rate (≥96 kHz), a path delay caused by a potential inclusion of a downsampling filter for signal downsampling can be avoided. Further, since there is no need to include a data buffer structure for a noise reduction module in the hardware path, a processing delay of PSAP 200 can be reduced greatly.

Consistent with the present disclosure, processor 205 may include any appropriate type of microprocessor, central processing unit (CPU), graphics processing unit (GPU), digital signal processor, or microcontroller suitable for audio processing. Processor 205 may include one or more hardware units (e.g., portion(s) of an integrated circuit) designed for use with other components or to execute part of an audio processing program. The program may be stored on a computer-readable medium, and when executed by processor 205, it may perform one or more functions disclosed herein. Processor 205 may be configured as a separate processor module dedicated to performing noise suppression. Alternatively, processor 205 may be configured as a shared processor module for performing other functions unrelated to noise suppression.

Processor 205 may be a complex instruction set computing (CISC) microprocessor, a reduced instruction set computing (RISC) microprocessor, a very long instruction word (VLIW) microprocessor, a processor executing any other type of instruction sets, or a processor that executes a combination of different instruction sets. In some implementations, processor 205 may be a special-purpose processor rather than a general-purpose processor. Processor 205 may include one or more special-purpose processing devices, such as application specific integrated circuits (ASICs), field programmable gate arrays (FPGAs), digital signal processors (DSPs), systems on a chip (SoCs), and the like.

Processor 205 may include one or more known processing devices such as the Pentium™, Core™, Xeon™, or Itanium™ series of microprocessors manufactured by Intel Corporation, Turion™, Athlon™, Sempron™, Opteron™, FX™, Phenom™ series of microprocessors or any processors manufactured by Sun Microsystems. Processor 205 may also include a graphics processing unit, such as a CPU from the GeForce®, Quadro®, or Tesla® series of Nvidia; a GPU form the Graphic Memory Access (GMA) or Iris™ series of Intel™; or a GPU from the Radeon™ series of AMD. Processor 205 may also include an accelerated processing unit, such as the Desktop A-4 (6, 8) series manufactured by AMD, or the Xeon Phi™ series manufactured by Intel Corporation. The present disclosure is not limited to any type of processor or processor circuit, as long as the processor or processor circuit can be configured for processing environmental audio signals. Additionally, the term "processor" disclosed herein may include more than one processor, e.g., a processor with multiple cores or multiple processors each of which has a multi-core design.

Consistent with the present disclosure, memory 212 may include any appropriate type of mass storage provided to store any type of information that processor 205 may need to operate. For example, memory 212 may be a volatile or non-volatile, magnetic, semiconductor-based, tape-based, optical, removable, non-removable, or other type of storage device or tangible (i.e., non-transitory) computer-readable medium including, but not limited to, a Read-Only Memory (ROM), a flash memory, a dynamic Random Access Memory (RAM), and a static RAM. Memory 212 may be configured to store one or more computer programs that may be executed by processor 205 to perform functions disclosed herein. Memory 212 may be further configured to store information and data used by processor 205.

Figure 3A:
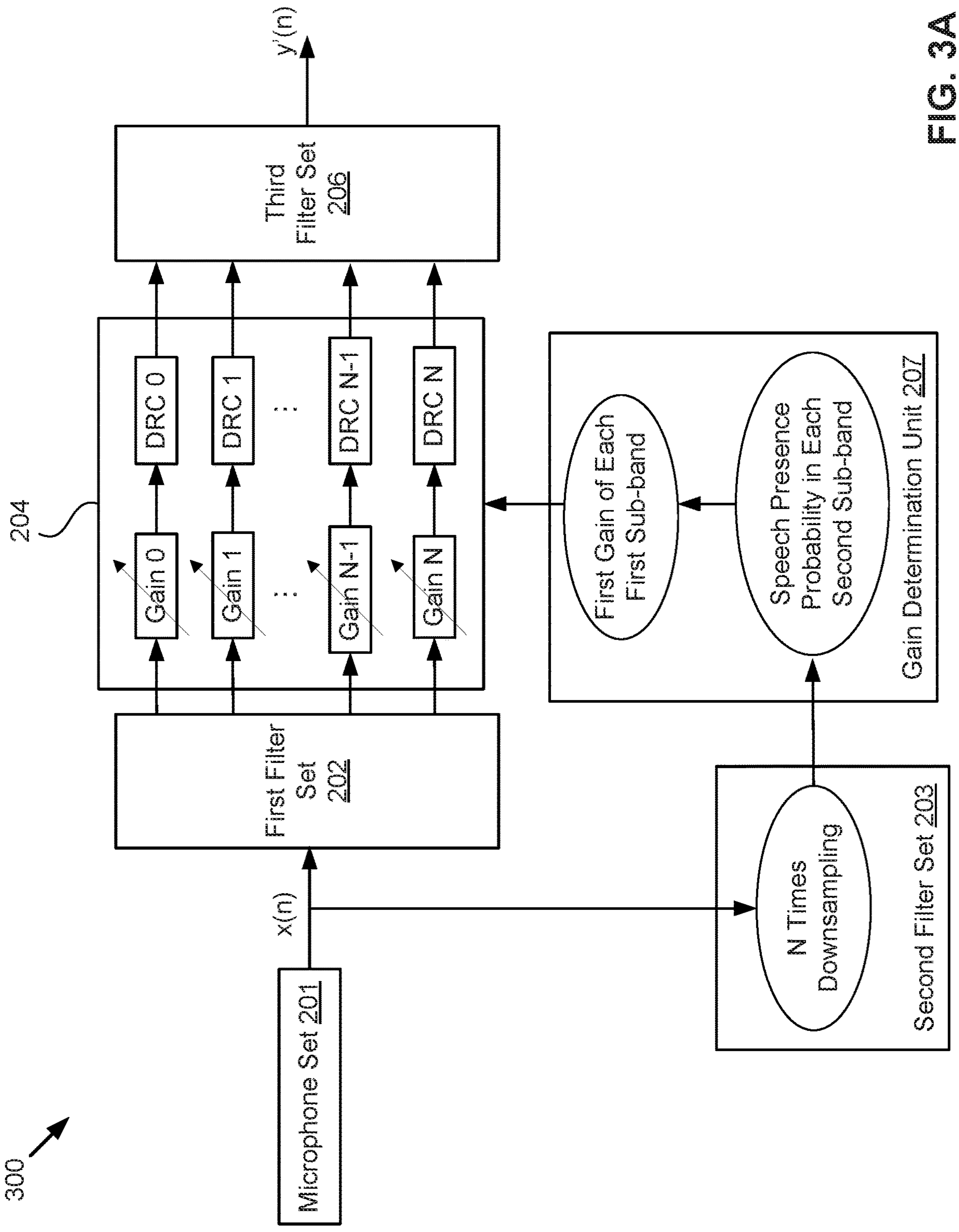
FIGS. 3A-3C illustrate block diagrams of various exemplary implementations of a PSAP with noise suppression, according to some aspects of the present disclosure.
Figure 3B:
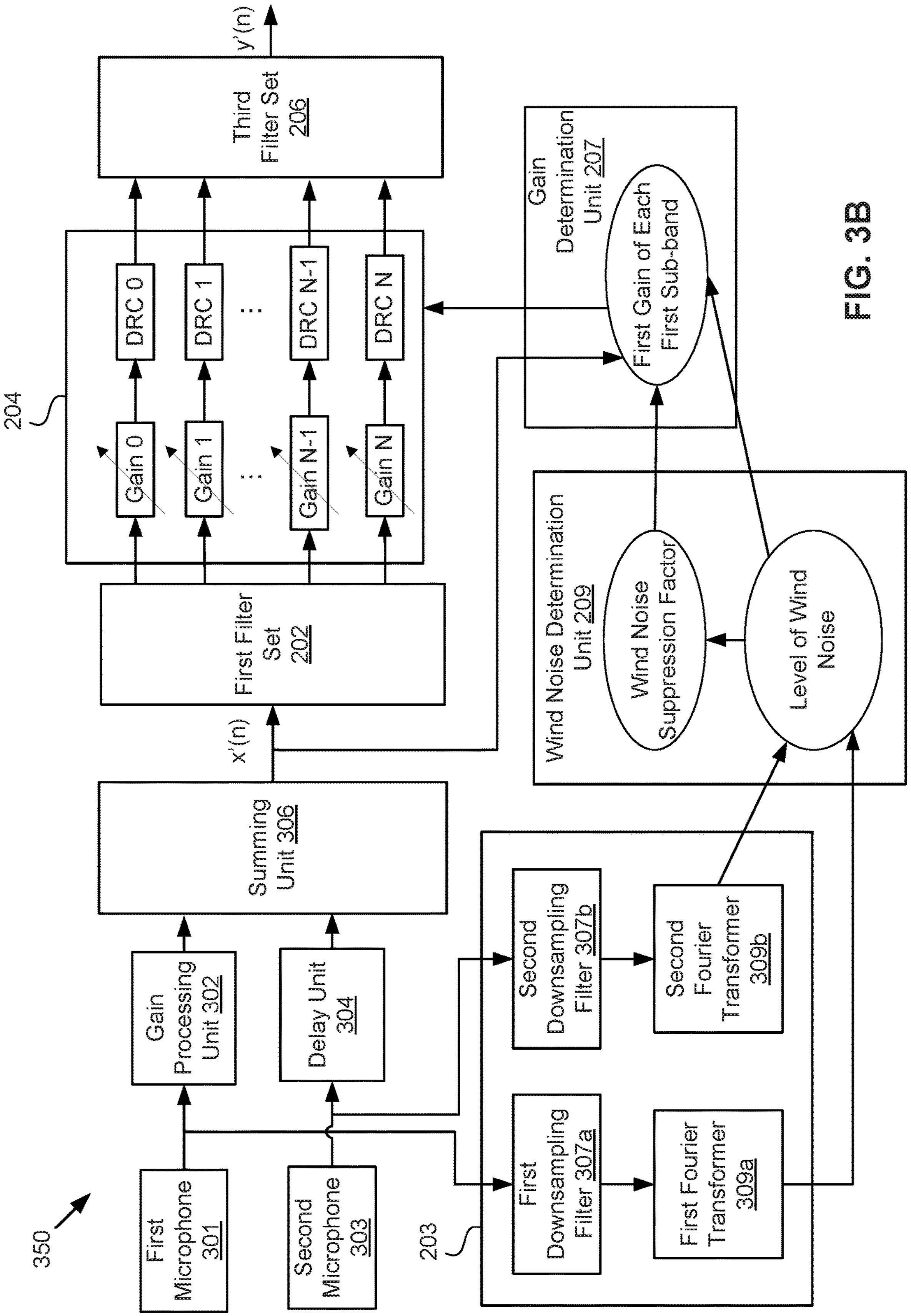
Figure 3C:
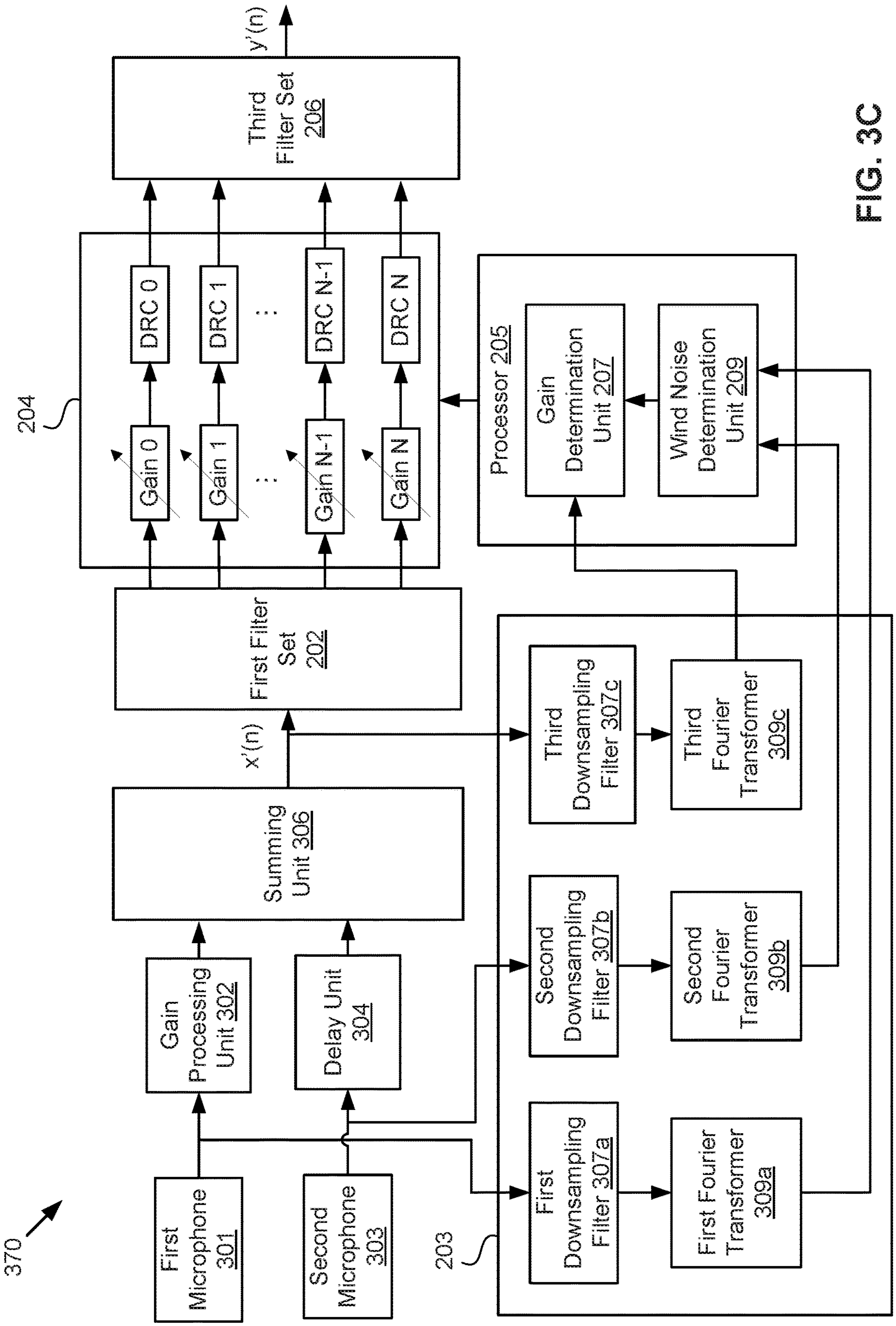

FIGS. 3A-3C illustrates block diagrams of various exemplary implementations 300, 350, and 370 of a PSAP with noise suppression, according to some aspects of the present disclosure. The PSAP of FIGS. 3A-3C can be PSAP 200 of FIG. 2 or any other suitable PSAP. Implementations 300, 350, and 370 of the PSAP in FIGS. 3A-3C may include components like those of FIG. 2, and the similar description will not be repeated herein.

With reference to FIG. 3A, the environmental audio signal x(n) may be processed by first filter set 202 and divided into a set of first sub-band signals in a set of first sub-bands. The environmental audio signal x(n) may also be processed by second filter set 203 with N times downsampling (with N≥1) and divided into a set of second sub-band signals in a set of second sub-bands. Gain determination unit 207 may determine a speech presence probability in each second sub-band by performing operations like those described above with reference to FIG. 2, so that a set of second gains can be determined for the set of second sub-bands based on the set of speech presence probabilities, respectively. Gain determination unit 207 may determine a set of first gains for the set of first sub-bands based on the set of second gains. Gain control set 204 may apply the set of first gains to the set of first sub-band signals, respectively, and third filter set 206 may synthesize the set of first sub-band signals to generate a noise-suppressed audio signal y'(n).

With reference to FIG. 3B, microphone set 201 may include a first microphone 301 and a second microphone 303. The PSAP of FIG. 3B may further include a gain processing unit 302, a delay unit 304, and a summing unit 306. The environmental audio signal x(n) may include a first audio signal acquired by first microphone 301 and a second audio signal acquired by second microphone 303. Gain processing unit 302 may process the first audio signal to control a gain of the first audio signal. Delay unit 304 may adjust a delay of the second audio signal. Then, summing unit 306 may add the first audio signal with the second audio signal to generate a processed environmental audio signal x'(n).

The processed environmental audio signal x'(n) may be processed by first filter set 202 and divided into a set of first sub-band signals in a set of first sub-bands. The environmental audio signal x'(n) may also be processed by second filter set 203 with N times downsampling (with N≥1) and divided into a set of second sub-band signals in a set of second sub-bands. Gain determination unit 207 may determine a speech presence probability in each second sub-band by performing operations like those described above with reference to FIG. 2, so that a set of second gains can be determined for the set of second sub-bands based on the set of speech presence probabilities, respectively.

Second filter set 203 may further include a first downsampling filter 307*a*, a second downsampling filter 307*b*, a first Fourier transformer 309*a*, and a second Fourier transformer 309*b*. The first audio signal may also be processed by first downsampling filter 307*a* to lower a sampling rate of the first audio signal and processed by first Fourier transformer 309*a* to transform into the frequency domain, and then be provided to wind noise determination unit 209. Similarly, the second audio signal may also be processed by second downsampling filter 307*b* to lower a sampling rate of the second audio signal and processed by second Fourier transformer 309*b* to transform into the frequency domain, and then be provided to wind noise determination unit 209.

Consistent with the present disclosure, wind noise is mainly generated by the impact of external air flow that hits microphone set 201 (e.g., first microphone 301 and second microphone 303), and the hitting impact is not regular. A correlation between the first audio signal and the second audio signal (e.g., a relevance factor ρ) can be used to determine whether there is wind noise present in the collected environmental audio signal, if the wind noise is present, the suppression of the wind noise can be performed further based on the correlation.

Wind noise determination unit 209 may determine the relevance factor ρ between the first and second audio signals. Specifically, wind noise determination unit 209 may determine a first energy parameter PS_X1 associated with the first audio signal within a frequency range (e.g., 10 Hz to 2 kHz), and determine a second energy parameter associated with the second audio signal within the frequency range. Wind noise determination unit 209 may determine the relevance factor ρ based on the first and second energy parameters PS_X1 and PS_X2. For example, the first and second energy parameters PS_X1 and PS_X2 and the relevance factor ρ can be determined by the following equations (5)-(7), respectively:

$$\text{PS\_X1} = X1^2, \tag{5}$$

$$\text{PS\_X2} = X2^2, \tag{6}$$

and $$\rho = \frac{\text{cov}(X1, X2)}{\sqrt{\text{PS\_X1}} \cdot \sqrt{\text{PS\_X2}}}. \tag{7}$$

In the above equations, X1 represents the first audio signal after being processing by first Fourier transformer 309*a*. X2 represents the second audio signal after being processing by second Fourier transformer 309*b*. cov(X1, X2) represents a covariance between X1 and X2.

It is found through experiments that the energy of wind noise is mainly concentrated in low frequencies and rolls off as the frequency increases. Thus, the first and second energy parameters PS_X1 and PS_X2 can be calculated within a frequency range such as from 10 Hz to 2 kHz. In this case, the amount of calculation can be reduced while ensuring the accurate reduction or elimination of the wind noise. In some implementations, the frequency range can be any range between 10 Hz-2 kHz, for example, 10 Hz-50 Hz, 50 Hz-200 Hz, 200 Hz-400 Hz, 400 Hz-500 Hz, 500 Hz-1000 Hz, 1000 Hz-2000 Hz, etc.

In some implementations, wind noise determination unit 209 may use the relevance factor ρ to determine whether there is wind noise present in the external environment. For example, when the relevance factor ρ is close to 1 (e.g., p having a value between 0.8 and 1) or equal to or greater than a relevance threshold (e.g., the relevance threshold being 0.8), wind noise determination unit 209 may determine that there is no wind or very little wind in the environment, and no wind noise suppression processing is needed. The power consumption of the wind noise reduction processing can be avoided to prolong the battery usage time of the PSAP.

In another example, if the relevance factor ρ is smaller than the relevance threshold, wind noise determination unit 209 may determine that there is wind noise present in the environment. Wind noise determination unit 209 may estimate an energy factor α based on the first and second audio signals. For example, wind noise determination unit 209 may estimate wind energy based on the first and second audio signals, and estimate the energy factor α based on the wind energy. Specifically, the energy factor α can be determined by the following equation:

$$\alpha = \begin{cases} fw1 & Ew < P1 \\ fw2 & P1 \le Ew \le P2 \\ fw3 & Ew > P2 \end{cases}. \tag{8}$$

In the above equation (8), fw1 denotes a first preset value of the energy factor α, fw2 denotes a second preset value of the energy factor α, fw3 denotes a third present value of the energy factor α, Ew denotes the wind energy, P1 denotes a first energy threshold, P2 denotes a second energy threshold, and P1 and P2 are preset constants. P1<P2 and fw1≥fw2≥fw3. The higher the wind energy Ew is, the smaller the energy factor α is.

By way of examples, the wind energy Ew can be equal to the first energy parameter PS_X1, the second energy PS_X2, or an average of the first energy parameter PS_X1 and the second energy PS_X2. Or, the wind energy Ew can be any other energy parameter calculated based on the first energy parameter PS_X1 and/or the second energy parameter PS_X2. The first and second energy thresholds P1 and P2 may be determined according to wind levels in a national standard. Generally, a higher wind level indicates a faster wind speed, higher wind energy, and greater wind noise. It can be simple and efficient to determine the first and second energy thresholds P1 and P2 based on the wind level.

By way of examples, fw1 can be set to a value greater than 1.5 and less than or equal to 2; fw2 can be set to a value greater than 1 and less than or equal to 1.5; and fw3 can be set to a value greater than 0 and less than or equal to 0.5. For example, in the case of low wind energy, i.e., Ew<P1, the first preset value fw1 of the energy factor α may be 1.8 (e.g., fw1=1.8); in the case of medium wind energy, i.e., P1≤Ew≤P2, the second preset value fw2 of the energy factor α may be 1.4 (e.g., fw2=1.4); in the case of high wind energy, that is Ew>P2, the third preset value fw3 of the energy factor α may be 0.2 (e.g., fw3=0.2). It is contemplated that the first; second, and third preset values fw1, fw2, fw3 of the energy factor α may also be determined using other methods, which is not limited in the present disclosure.

After determining the energy factor α, wind noise determination unit 209 may determine a composite wind noise indicator based on the relevance factor ρ and the energy factor α, and determine a level of wind noise based on the composite wind noise indicator. For example, the composite wind noise indicator and the level of wind noise can be determined using the following equations:

$$CI = \alpha \cdot \rho, \tag{9}$$

and $$LW = \begin{cases} lw1 & CI < \omega1 \\ lw2 & \omega1 \le CI \le \omega2 \\ lw3 & CI > \omega2 \end{cases}, \text{ where } lw1 > lw2 > lw3. \tag{10}$$

In the above equations, CI denotes the composite wind noise indicator. LW denotes the level of wind noise, lw1 represents a first wind noise level, lw2 represents a second wind noise level, and lw3 represents a third wind noise level. ω1 and ω2 are a first level threshold and a second level threshold for the composite wind noise indicator CI, and ω1 and ω2 are preset constants.

From the above description, it can be seen that by comparing the wind energy Ew with the determined first and second energy thresholds P1 and P2 as shown in the above equation (8), values of the energy factor α under different wind energy conditions can be determined. Using the energy factor α determined under different wind energy conditions as a weighting factor for the level of wind noise, the level of wind noise can be determined more accurately, as shown in the above equations (9)-(10). Thus, wind noise suppression can be performed more effectively using the accurate level of wind noise. In this way, effective noise reduction processing can be performed to reduce the wind noise that appears as a random signal and has no fixed phase. Thus, a user's listening experience and speaking experience through the PSAP can be improved.

Wind noise determination unit 209 may also determine a wind noise suppression factor based on the level of wind noise. For example, wind noise determination unit 209 may determine a wind noise suppression factor for each frequency band (e.g., each first sub-band or each second sub-band) based on the level of wind noise. In some cases, a higher level of wind noise may result in a smaller wind noise suppression factor, indicating a larger amount of wind noise suppression.

In some implementations, when a frequency band is higher than 2 kHz, a wind noise suppression factor for the frequency band can be 1. This is because the frequencies of wind noise are mainly reflected in the low frequency band, and the high frequency band (e.g., higher than 2 kHz) is less affected by the wind noise. Therefore, the wind noise suppression factor for the high frequency band can be set to 1 (e.g., without gain suppression processing). The amount of computation for noise reduction processing can therefore be reduced at the high frequency band. In some implementations, a wind noise suppression factor corresponding to a frequency band (e.g., the frequency band ≤2 kHz) can be determined based on the level of wind noise, a gain of the frequency band, and one or more gains of one or more neighboring frequency bands next to the frequency band.

In some implementations, based on the level of wind noise, a wind noise suppression factor corresponding to a frequency band (e.g., the frequency band ≤2 kHz) may be determined as follows: (a) when the level of wind noise is the first wind noise level, the wind noise suppression factor corresponding to the frequency band can be a value greater than 0 and less than or equal to ⅛; (b) when the level of wind noise is the second wind noise level, the wind noise suppression factor corresponding to the frequency band can be a value greater than ⅛ and less than or equal to ¼; (c) when the level of wind noise is the third wind noise level, the wind noise suppression factor corresponding to the frequency band can be a value greater than ¼ and less than or equal to ½. The first, second, and third wind noise levels may correspond to a high wind level, a moderate wind level, and a light wind level, respectively. Based on the different wind noise levels, the wind noise suppression factor corresponding to each frequency band can be determined respectively, so as to control the respective gain on each frequency band. Experiments show that when the respective gain of each frequency band is adjusted based on the wind noise suppression factor, the wind noise can be effectively suppressed, and the noise reduction effect of the PSAP is remarkable.

By performing operations like those described above for each first sub-band, wind noise determination unit 209 may determine a set of wind noise suppression factors for the set of first sub-bands. For example, for each first sub-band greater than 2 kHz, the wind noise suppression factor for the first sub-band can be set to 1 (e.g., without gain suppression processing). For each first sub-band smaller than or equal to 2 kHz, the wind noise suppression factor for the first sub-band can be determined based on the level of wind noise as described above. The wind noise suppression factors for first sub-bands smaller than or equal to 2 kHz can be the same. Or, the wind noise suppression factors for the first sub-bands smaller than or equal to 2 kHz can be different from one another.

Subsequently, gain determination unit 207 may determine a set of first gains for the set of first sub-bands based on the set of second gains and the level of wind noise as described above with reference to FIG. 2. Alternatively or additionally, gain determination unit 207 may adjust the set of first gains based on the set of wind noise suppression factors for the set of first sub-bands, respectively. Gain control set 204 may apply the set of first gains to the set of first sub-band signals, respectively, and third filter set 206 may synthesize the set of first sub-band signals to generate a noise-suppressed audio signal y'(n).

Consistent with the present disclosure, a frequency band interval of the first and second audio signals after first Fourier transformer 309*a* and second Fourier transformer 309*b* can be less than or equal to a minimum interval of the first sub-bands. In some implementations, after obtaining a wind noise suppression factor corresponding to a frequency band at a low sampling rate, the wind noise suppression factor can be mapped to a corresponding first sub-band of the PSAP, so that the wind noise suppression factor can be used to control Gain 0, Gain 1, . . . , Gain N−1, or Gain N. In some implementations, after using the wind noise suppression factor to control Gain 0, Gain 1, . . . , Gain N−1, or Gain N, the first gains of the set of first sub-band signals can be further processed through various dynamic range control units such as DRC 0, DRC 1, . . . , DRC N−1, or DRC N.

In some examples, since the wind noise energy is mainly concentrated within 2 kHz, only adjusting the gains within 2 kHz based on the energy of the wind noise within 2 kHz can achieve a desirable wind noise suppression effect and save computing power. In some examples, when it is desired to control the wind noise suppression effect in a finer manner, smaller frequency intervals can be selected to divide the frequency band into smaller sub-bands with consideration of a circuit area and power consumption, so as to achieve finer wind noise suppression and further improve the user's listening and talking experience.

With reference to FIG. 3C, the similar description for components like those of MG. 3B will not be repeated herein. The environmental audio signal x(n) may include a first audio signal acquired by first microphone 301 and a second audio signal acquired by second microphone 303. Summing unit 306 may add the first audio signal processed by gain processing unit 302 with the second audio signal processed by delay unit 304 to generate a processed environmental audio signal x'(n), The processed environmental audio signal x'(n) may be processed by first filter set 202 and divided into a set of first sub-band signals in a set of first sub-bands.

Second filter set 203 may further include a third downsampling filter 307*c* and a third Fourier transformer 309*c*. The environmental audio signal x'(n) may also be processed by third downsampling filter 307*c* and third Fourier transformer 309*c* and divided into a set of second sub-band signals in a set of second sub-bands. Gain determination unit 207 may determine a speech presence probability in each second sub-band by performing operations like those described above with reference to FIG. 2. Then, a set of second gains can be determined for the set of second sub-bands based on a set of speech presence probabilities in the set of second sub-bands, respectively.

Wind noise determination unit 209 may determine a level of wind noise or a set of wind noise suppression factors by performing operations like those described above with reference to FIG. 3B. Gain determination unit 207 may determine a set of first gains in the set of first sub-bands based on the level of wind noise and the set of second gains in the set of second sub-bands. Alternatively or additionally, gain determination unit 207 may adjust the set of first gains based on the set of wind noise suppression factors for the set of first sub-bands, respectively. Gain control set 204 may apply the set of first gains to the set of first sub-band signals, respectively, and third filter set 206 may synthesize the set of first sub-band signals to generate a noise-suppressed audio signal y'(n).

Figure 4:
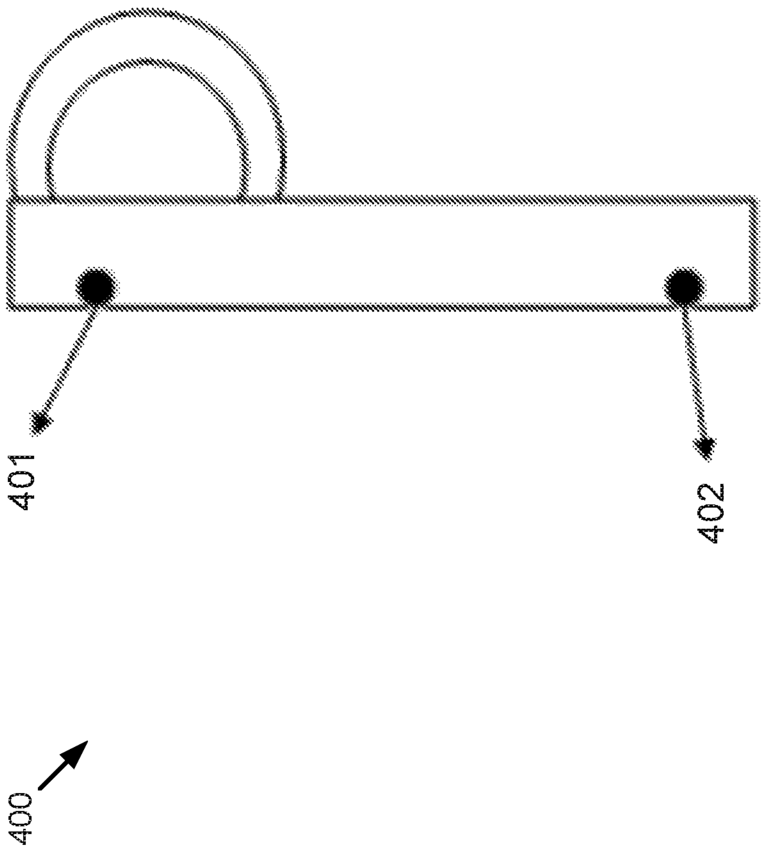
FIG. 4 is a graphical representation illustrating an exemplary PSAP, according to some aspects of the present disclosure.

FIG. 4 is a graphical representation illustrating an exemplary PSAP 400, according to some aspects of the present disclosure. PSAP 400 can be any PSAP of FIGS. 2-3C. PSAP 400 may include a first microphone 401 and a second microphone 402 arranged on the outside of PSAP 400. PSAP 400 may be, for example, a wireless earphone or a wired earphone with a hearing aid function. Microphones 401 and 402 can be arranged in positions to facilitate a beamforming of sound of interest, so as to facilitate the method and system disclosed herein to achieve at least one of the hearing aid function, a speech communication function, or a noise reduction function disclosed herein.

Figure 5:
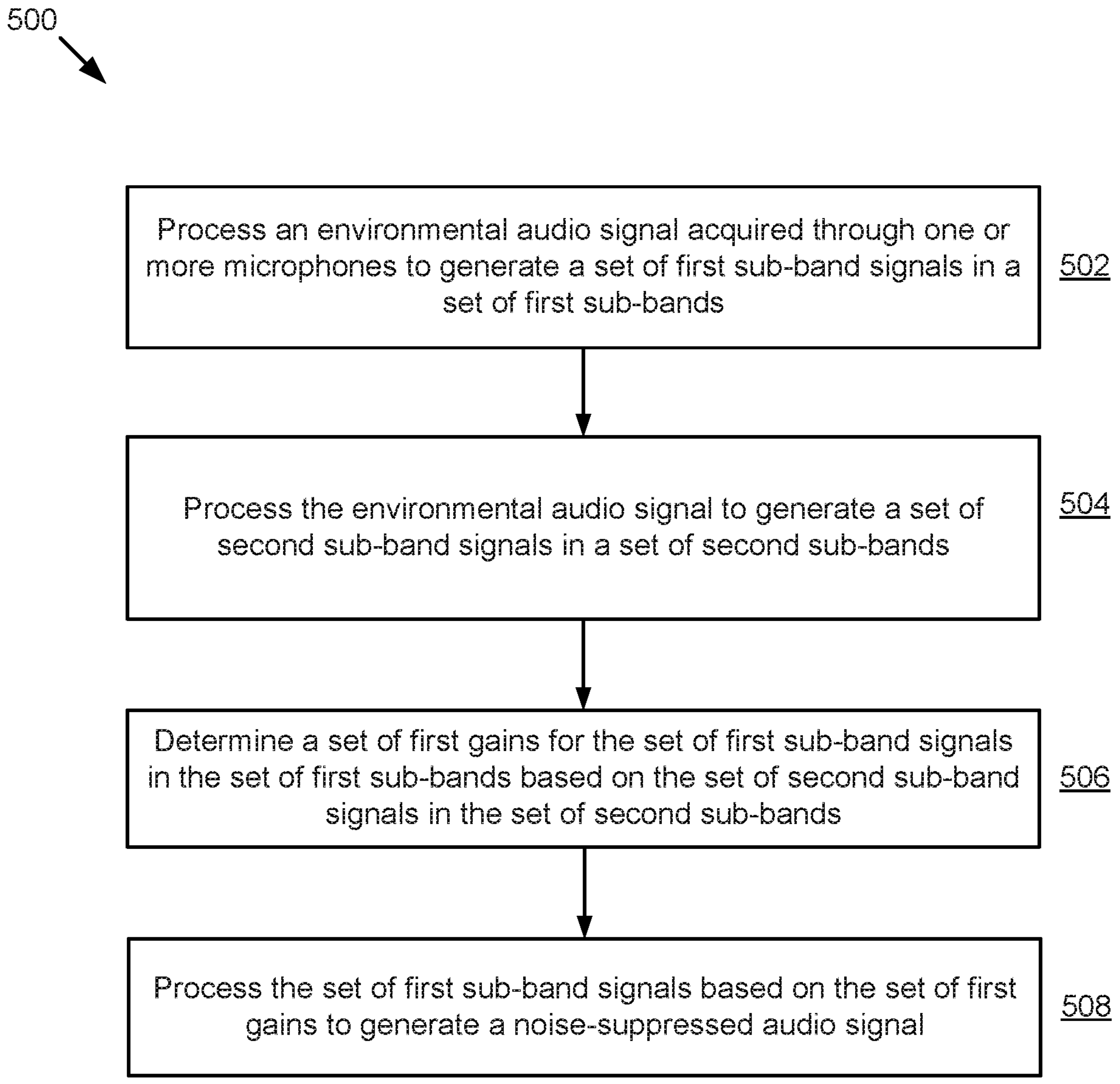
FIG. 5 illustrates a flowchart of an exemplary noise suppression method for a PSAP, according to some aspects of the present disclosure.

FIG. 5 illustrates a flowchart of an exemplary noise suppression method 500 for a PSAP, according to some aspects of the present disclosure. The PSAP can be any PSAP of FIGS. 2-4. Method 500 may be implemented by the PSAP. It is understood that the operations shown in method 500 may not be exhaustive and that other operations can be performed as well before, after, or between any of the illustrated operations. Further, some of the operations may be performed simultaneously, or in a different order than shown in FIG. 5.

Referring to FIG. 5, method 500 starts at operation 502, in which an environmental audio signal acquired through one or more microphones is processed to generate a set of first sub-band signals in a set of first sub-bands.

Method 500 proceeds to operation 504, as illustrated in FIG. 5, in which the environmental audio signal is also processed to generate a set of second sub-band signals in a set of second sub-bands.

Method 500 proceeds to operation 506, as illustrated in FIG. 5, in which a set of first gains for the set of first sub-band signals in the set of first sub-bands is determined based on the set of second sub-band signals in the set of second sub-bands.

Method 500 proceeds to operation 508, as illustrated in FIG. 5, in which the set of first sub-band signals is processed based on the set of first gains to generate a noise-suppressed audio signal.

Figure 6:
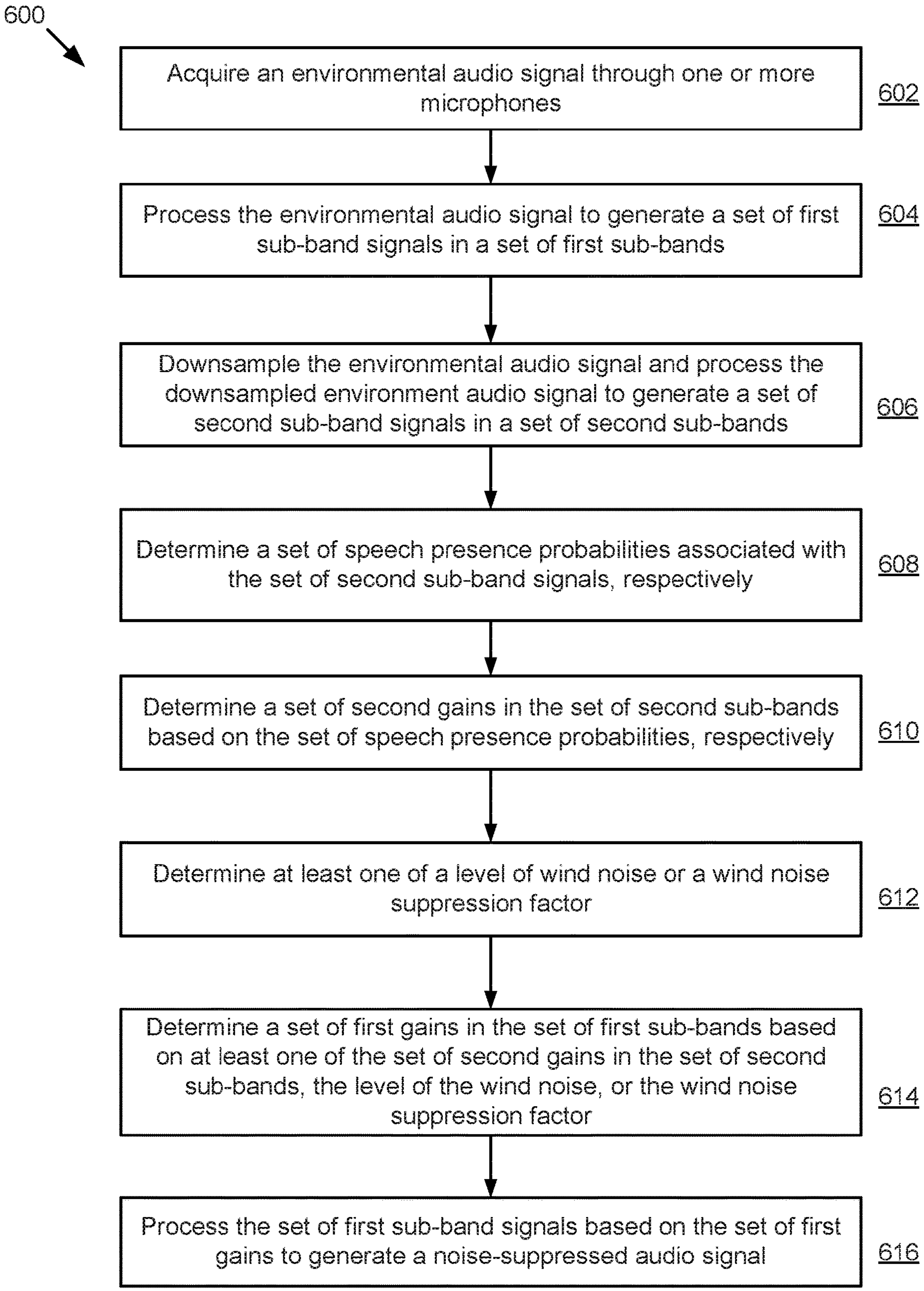
FIG. 6 illustrates a flowchart of another exemplary noise suppression method for a PSAP, according to some aspects of the present disclosure.

FIG. 6 illustrates a flowchart of another exemplary noise suppression method 600 for a PSAP, according to some aspects of the present disclosure. The PSAP can be any PSAP of FIGS. 2-4. Method 600 may be implemented by the PSAP. It is understood that the operations shown in method 600 may not be exhaustive and that other operations can be performed as well before, after, or between any of the illustrated operations. Further, some of the operations may be performed simultaneously, or in a different order than shown in FIG. 6.

Referring to FIG. 6, method 600 starts at operation 602, in which an environmental audio signal is acquired through one or more microphones.

Method 600 proceeds to operation 604, as illustrated in FIG. 6, in which the environmental audio signal is processed to generate a set of first sub-band signals in a set of first sub-bands.

Method 600 proceeds to operation 606, as illustrated in FIG. 6, in which the environmental audio signal is down-sampled, and the downsampled environmental audio signal is processed to generate a set of second sub-band signals in a set of second sub-bands.

Method 600 proceeds to operation 608, as illustrated in FIG. 6, in which a set of speech presence probabilities associated with the set of second sub-band signals is determined, respectively.

Method 600 proceeds to operation 610, as illustrated in FIG. 6, in which a set of second gains in the set of second sub-bands is determined based on the set of speech presence probabilities, respectively.

Method 600 proceeds to operation 612, as illustrated in FIG. 6, in which at least one of a level of wind noise or a wind noise suppression factor is determined.

Method 600 proceeds to operation 614, as illustrated in FIG. 6, in which a set of first gains in the set of first sub-bands is determined based on at least one of the set of second gains in the set of second sub-bands, the level of wind noise, or the wind noise suppression factor.

Method 600 proceeds to operation 616, as illustrated in FIG. 6, in which the set of first sub-band signals is processed based on the set of first gains to generate a noise-suppressed audio signal.

Figure 7:
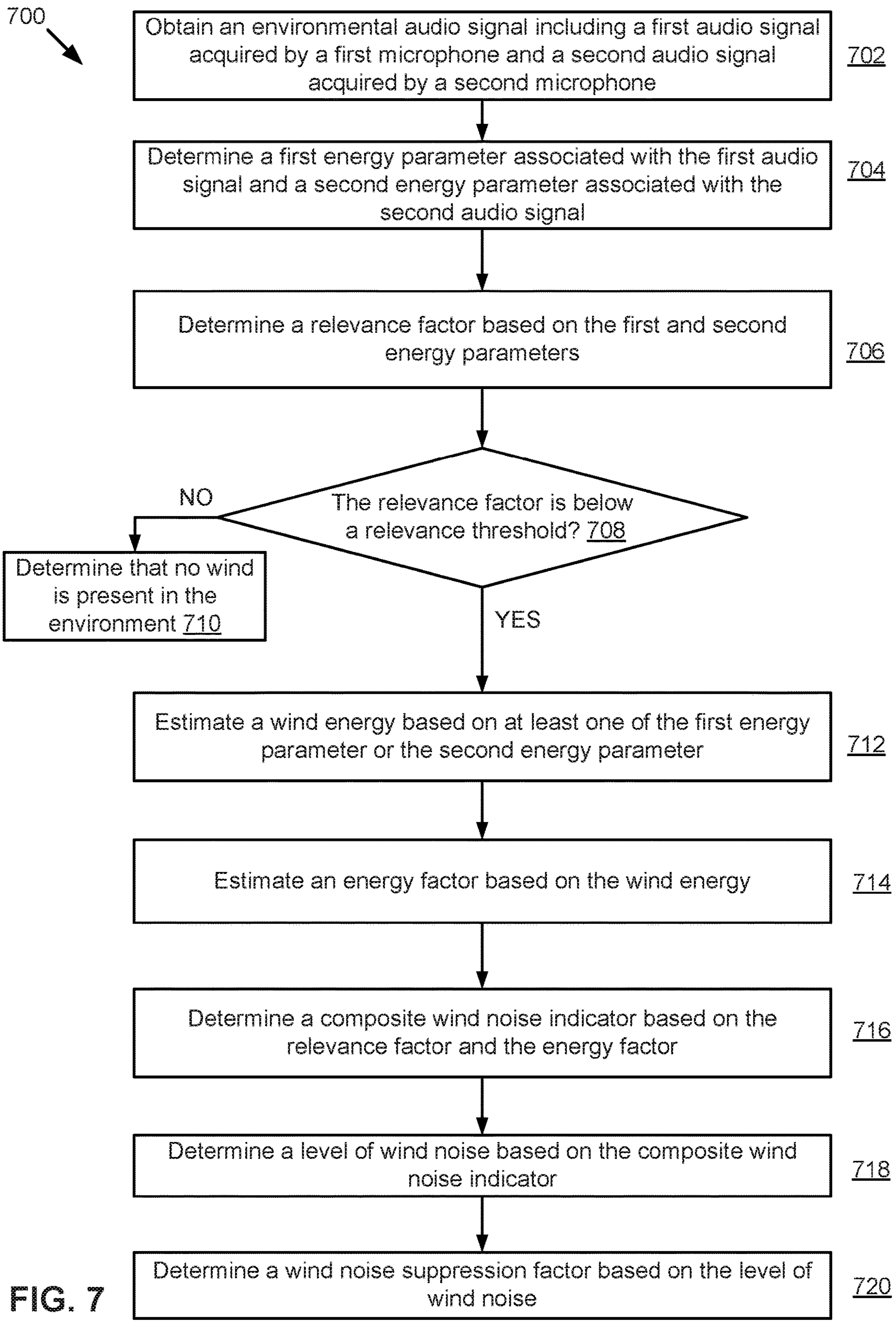
FIG. 7 illustrates a flowchart of an exemplary method for determining a level of wind noise or a wind noise suppression factor, according to some aspects of the present disclosure.

FIG. 7 illustrates a flowchart of an exemplary method 700 for determining a level of wind noise or a wind noise suppression factor, according to some aspects of the present disclosure. Method 700 can be an exemplary implementation of operation 612 of FIG. 6. Method 700 may be implemented by any PSAP disclosed herein. It is understood that the operations shown in method 700 may not be exhaustive and that other operations can be performed as well before, after, or between any of the illustrated operations. Further, some of the operations may be performed simultaneously, or in a different order than shown in FIG. 7.

Referring to FIG. 7, method 700 starts at operation 702, in which an environmental audio signal including a first audio signal acquired by a first microphone and a second audio signal acquired by a second microphone is obtained.

Method 700 proceeds to operation 704, as illustrated in FIG. 7, in which a first energy parameter associated with the first audio signal and a second energy parameter associated with the second audio signal are determined.

Method 700 proceeds to operation 706, as illustrated in FIG. 7, in which a relevance factor is determined based on the first and second energy parameters.

Method 700 proceeds to operation 708, as illustrated in FIG. 7, in which it is determined whether the relevance factor is below a relevance threshold. Responsive to the relevance factor being below the relevance threshold, method 700 proceeds to operation 712. Otherwise, method 700 proceeds to operation 710.

At operation 710, as illustrated in FIG. 7, it is determined that no wind is present in the environment.

At operation 712, as illustrated in FIG. 7, a wind energy is estimated based on at least one of the first energy parameter or the second energy parameter.

Method 700 proceeds to operation 714, as illustrated in FIG. 7, in which an energy factor is estimated based on the wind energy.

Method 700 proceeds to operation 716, as illustrated in FIG. 7, in which a composite wind noise indicator is determined based on the relevance factor and the energy factor.

Method 700 proceeds to operation 718, as illustrated in FIG. 7, in which a level of wind noise is determined based on the composite wind noise indicator.

Method 700 proceeds to operation 720, as illustrated in FIG. 7, in which a wind noise suppression factor is determined based on the level of wind noise.

Figure 8:
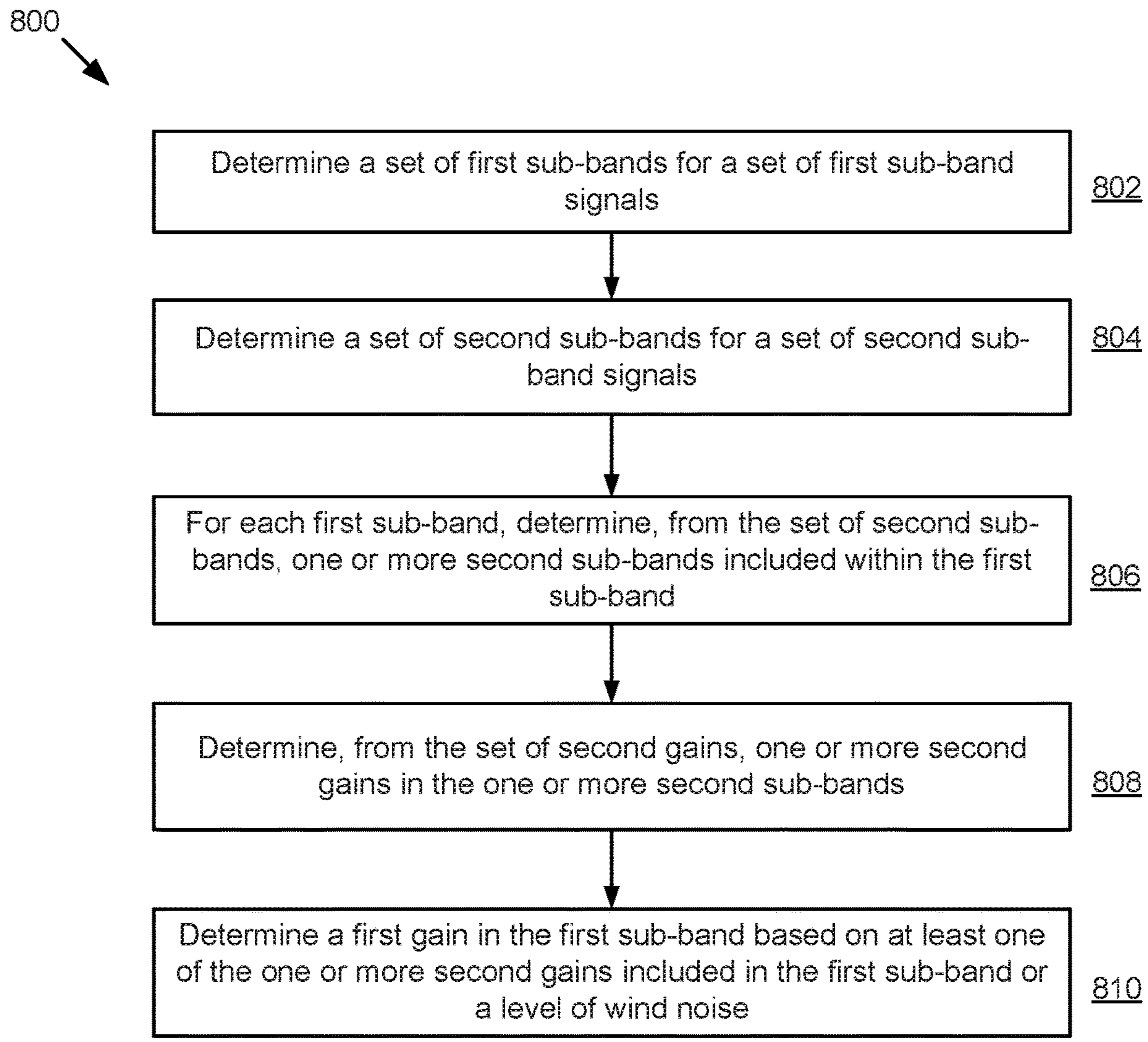
FIG. 8 illustrates a flowchart of an exemplary method for determining a set of first gains in a set of first sub-bands, according to some aspects of the present disclosure.

FIG. 8 illustrates a flowchart of an exemplary method 800 for determining a set of first gains in a set of first sub-bands, according to some aspects of the present disclosure. Method 800 can be an exemplary implementation of operation 614 of FIG. 6. Method 800 may be implemented by any PSAP disclosed herein. It is understood that the operations shown in method 800 may not be exhaustive and that other operations can be performed as well before, after, or between any of the illustrated operations. Further, some of the operations may be performed simultaneously, or in a different order than shown in FIG. 8.

Referring to FIG. 8, method 800 starts at operation 802, in which a set of first sub-bands is determined for a set of first sub-band signals.

Method 800 proceeds to operation 804, as illustrated in FIG. 8, in which a set of second sub-bands is determined for a set of second sub-band signals.

Method 800 proceeds to operation 806, as illustrated in FIG. 8, in which for each first sub-band, one or more second sub-bands included within the first sub-band are determined from the set of second sub-bands.

Method 800 proceeds to operation 808, as illustrated in FIG. 8, in which one or more second gains in the one or more second sub-bands are determined from the set of second gains.

Method 800 proceeds to operation 810, as illustrated in FIG. 8, in which a first gain in the first sub-band is determined based on at least one of the one or more second gains included in the first sub-band or a level of wind noise.

Operations 806-810 may be performed for each first sub-band, so that a set of first gains can be determined for the set of first sub-bands, respectively.

Figure 9:
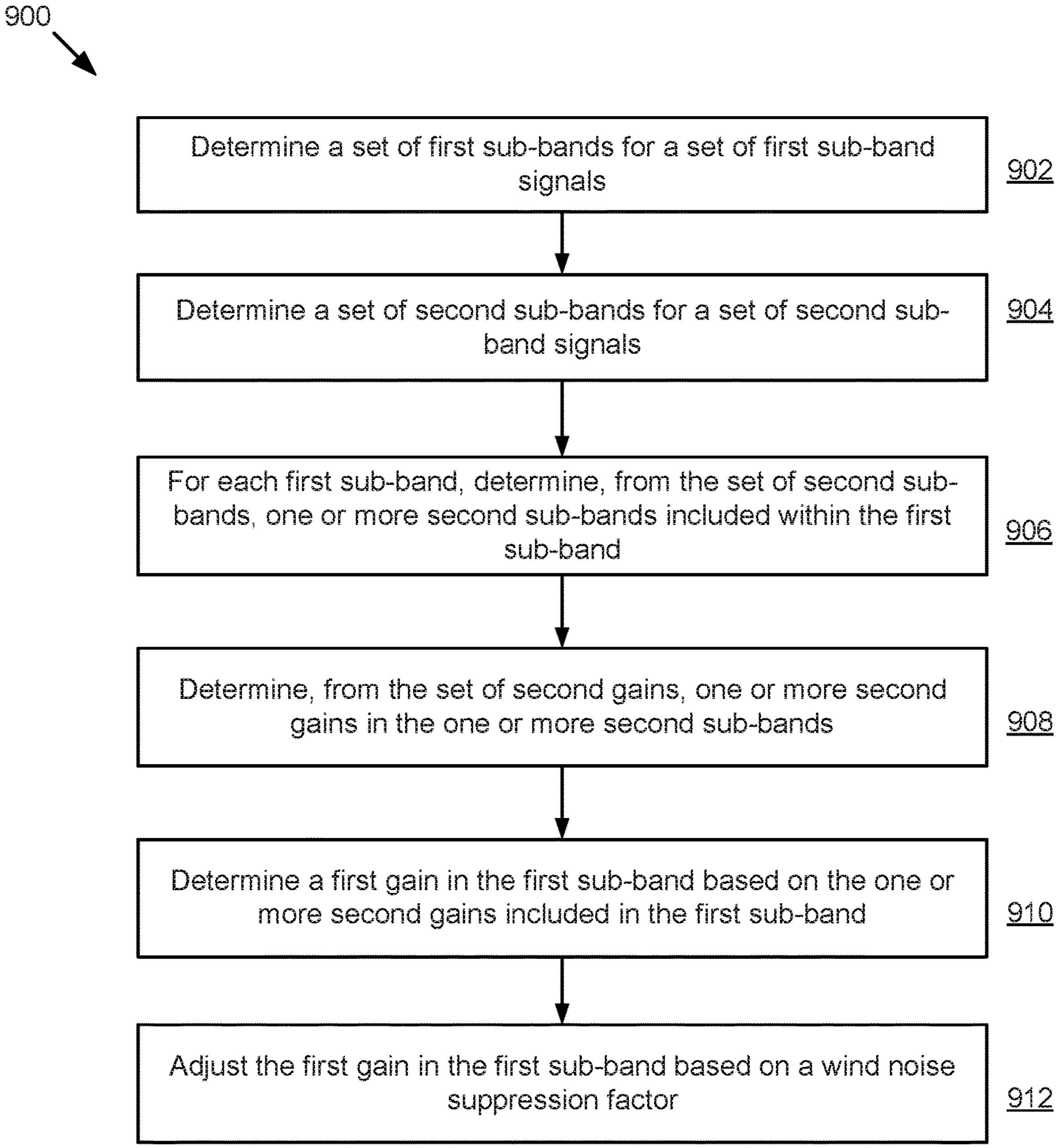
FIG. 9 illustrates a flowchart of another exemplary method for determining a set of first gains in a set of first sub-bands, according to some aspects of the present disclosure.

FIG. 9 illustrates a flowchart of another exemplary method 900 for determining a set of first gains in a set of first sub-bands, according to some aspects of the present disclosure. Method 900 can be an exemplary implementation of operation 614 of FIG. 6. Method 900 may be implemented by any PSAP disclosed herein. It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which a set of first sub-bands is determined for a set of first sub-band signals.

Method 900 proceeds to operation 904, as illustrated in FIG. 9, in which a set of second sub-bands is determined for a set of second sub-band signals.

Method 900 proceeds to operation 906, as illustrated in FIG. 9, in which for each first sub-band, one or more second sub-bands included within the first sub-band are determined from the set of second sub-bands.

Method 900 proceeds to operation 908, as illustrated in FIG. 9, in which one or more second gains in the one or more second sub-bands are deter mined from the set of second gains.

Method 900 proceeds to operation 910, as illustrated in FIG. 9, in which a first gain in the first sub-band is determined based on the one or more second gains included in the first sub-band.

Method 900 proceeds to operation 912, as illustrated in FIG. 9, in which the first gain in the first sub-band is adjusted based on a wind noise suppression factor.

Operations 906-912 may be performed for each first sub-band, so that a set of first gains can be determined for the set of first sub-bands, respectively.

According to one aspect of the present disclosure, a noise suppression method for a PSAP is disclosed. An environmental audio signal acquired through one or more microphones is processed to generate a set of first sub-band signals in a set of first sub-bands. The environmental audio signal is also processed to generate a set of second sub-band signals in a set of second sub-bands. A set of first gains for the set of first sub-band signals in the set of first sub-bands is determined based on the set of second sub-band signals in the set of second sub-bands. The set of first sub-band signals is processed based on the set of first gains to generate a noise-suppressed audio signal.

In some implementations, determining the set of first gains includes: determining a set of speech presence probabilities associated with the set of second sub-band signals; respectively; determining a set of second gains in the set of second sub-bands based on the set of speech presence probabilities, respectively; and determining the set of first gains in the set of first sub-bands based on the set of second gains in the set of second sub-bands.

In some implementations, the set of speech presence probabilities includes a set of posterior speech presence probabilities associated with the set of second sub-band signals.

In some implementations, determining the set of speech presence probabilities associated with the set of second sub-band signals, respectively, includes: for each second sub-band signal in a corresponding second sub-band, determining a prior speech presence probability and a SNR associated with the second sub-band signal; determining an intermediate variable determined based on the prior speech presence probability and the prior SNR; and determining a posterior speech presence probability associated with the second sub-band signal based on the prior speech presence probability, the prior SNR, and the intermediate variable.

In some implementations; determining the set of first gains in the set of first sub-bands based on the set of second gains in the set of second sub-bands includes: for each first sub-band, determining one or more second sub-bands included within the first sub-band from the set of second sub-bands; determining, from the set of second gains, one or more second gains in the one or more second sub-bands, respectively; and determining a first gain in the first sub-band based on the one or more second gains.

In some implementations, determining the first gain in the first sub-band based on the one or more second gains includes determining the first gain to be a maximal gain among the one or more second gains.

In some implementations, determining the first gain in the first sub-band based on the one or more second gains includes determining the first gain in the first sub-band from the one or more second gains further based on a level of wind noise.

In some implementations, a composite wind noise indicator associated with the wind noise is determined. The level of the wind noise is determined based on the composite wind noise indicator.

In some implementations, the environmental audio signal includes a first audio signal acquired by a first microphone and a second audio signal acquired by a second microphone. Determining the composite wind noise indicator associated with the wind noise includes: determining a relevance factor between the first and second audio signals; and responsive to the relevance factor being below a relevance threshold, estimating an energy factor based on the first and second audio signals, and determining the composite wind noise indicator based on the relevance factor and the energy factor.

In some implementations, determining the relevance factor between the first and second audio signals includes: determining a first energy parameter associated with the first audio signal; determining a second energy parameter associated with the second audio signal; and determining the relevance factor based on the first and second energy parameters.

In some implementations, estimating the energy factor based on the first and second audio signals includes: estimating a wind energy based on the first and second audio signals; and estimating the energy factor based on the wind energy.

In some implementations, determining the first gain in the first sub-band from the one or more second gains further based on the level of the wind noise includes: responsive to the first sub-band being smaller than or equal to a frequency threshold and the level of the wind noise being smaller than a level threshold, determining the first gain to be a maximal gain among the one or more second gains; responsive to the first sub-band being smaller than or equal to the frequency, threshold and the level of the wind noise being equal to or greater than the level threshold, determining the first gain to be a minimal gain among the one or more second gains; or responsive to the first sub-band being greater than the frequency threshold, determining the first gain to be one.

In some implementations, a wind noise suppression factor is determined based on a level of wind noise. The set of first gains is adjusted based on the wind noise suppression factor.

According to another aspect of the present disclosure, a PSAP includes one or more microphones configured to acquire an environmental audio signal, a first filter set configured to process the environmental audio signal to generate a set of first sub-band signals in a set of first sub-bands, a second filter set configured to process the environmental audio signal to generate a set of second sub-band signals in a set of second sub-bands, a processor configured to determine a set of first gains for the set of first sub-band signals in the set of first sub-bands based on the set of second sub-band signals in the set of second sub-bands, a set of gain control units configured to process the set of first sub-band signals based on the set of first gains, respectively, and a third filter set configured to synthesize the set of first sub-band signals to generate a noise-suppressed audio signal.

In some implementations, to determine the set of first gains, the processor is further configured to: determine a set of speech presence probabilities associated with the set of second sub-band signals, respectively; determine a set of second gains in the set of second sub-bands based on the set of speech presence probabilities, respectively; and determine the set of first gains in the set of first sub-bands based on the set of second gains in the set of second sub-bands.

In some implementations, the set of speech presence probabilities includes a set of posterior speech presence probabilities associated with the set of second sub-band signals. To determine the set of speech presence probabilities associated with the set of second sub-band signals, respectively, the processor is further configured to: for each second sub-band signal in a corresponding second sub-band, determine a prior speech presence probability and a prior SNR associated with the second sub-band signal; determine an intermediate variable determined based on the prior speech presence probability and the prior SNR; and determine a posterior speech presence probability associated with the second sub-band signal based on the prior speech presence probability, the prior SNR, and the intermediate variable.

In some implementations, to determine the set of first gains in the set of first sub-bands based on the set of second gains in the set of second sub-bands, the processor is further configured to for each first sub-band, determine one or more second sub-bands included within the first sub-band from the set of second sub-bands; determine, from the set of second gains, one or more second gains in the one or more second sub-bands, respectively; and determine a first gain in the first sub-band based on the one or more second gains.

In some implementations, to determine the first gain in the first sub-band based on the one or more second gains, the processor is further configured to determine the first gain in the first sub-band from the one or more second gains further based on a level of wind noise.

In some implementations, the one or more microphones include a first microphone and a second microphone. The environmental audio signal includes a first audio signal acquired by the first microphone and a second audio signal acquired by the second microphone. The processor is further configured to: determine a relevance factor between the first and second audio signals; estimate an energy factor based on the first and second audio signals; determine a composite wind noise indicator based on the relevance factor and the energy factor; and determine the level of the wind noise based on the composite wind noise indicator.

According to yet another aspect of the present disclosure, a noise suppression system for a PSAP is disclosed. The noise suppression system includes a memory storing code and a processor coupled to the memory. When the code is executed, the processor is configured to: receive a set of first sub-band signals in a set of first sub-bands; where the set of first sub-band signals is generated from an environmental audio signal acquired through one or more microphones; receive a set of second sub-band signals in a set of second sub-bands, where the set of second sub-band signals is also generated from the environmental audio signal; determine a set of first gains for the set of first sub-band signals in the set of first sub-bands based on the set of second sub-band signals in the set of second sub-bands; and provide the set of first gains to process the set of first sub-band signals so that a noise-suppressed audio signal is generated from the set of first sub-band signals.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method of noise suppression for a personal sound amplification product (PSAP), comprising:

processing an environmental audio signal acquired through one or more microphones to generate a set of first sub-band signals in a set of first sub-bands;

processing the environmental audio signal to generate a set of second sub-band signals in a set of second sub-bands;

determining a set of first gains for the set of first sub-band signals in the set of first sub-bands based on the set of second sub-band signals in the set of second sub-bands; and processing the set of first sub-band signals based on the set of first gains to generate a noise-suppressed audio signal, wherein determining the set of first gains comprises:

determining a set of speech presence probabilities associated with the set of second sub-band signals, respectively;

determining a set of second gains in the set of second sub-bands based on the set of speech presence probabilities, respectively; and determining the set of first gains in the set of first sub-bands based on the set of second gains in the set of second sub-bands:

wherein the set of speech presence probabilities comprises a set of posterior speech presence probabilities associated with the set of second sub-band signals; and wherein determining the set of speech presence probabilities associated with the set of second sub-band signals, respectively, comprises:

for each second sub-band signal in a corresponding second sub-band, determining a prior speech presence probability and a prior signal-to-noise ratio (SNR) associated with the second sub-band signal;

determining an intermediate variable determined based on the prior speech presence probability and the prior SNR; and determining a posterior speech presence probability associated with the second sub-hand signal based on the prior speech presence probability, the prior SNR, and the intermediate variable.

2. The method of claim 1, wherein determining the set of first gains in the set of first sub-bands based on the set of second gains in the set of second sub-bands comprises:

for each first sub-band, determining, from the set of second sub-bands, one or more second sub-bands included within the first sub-band;

determining, from the set of second gains, one or more second gains in the one or more second sub-bands, respectively; and determining a first gain in the first sub-band based on the one or more second gains.

3. The method of claim 2, wherein determining the first gain in the first sub-band based on the one or more second gains comprises:

determining the first gain in the first sub-band from the one or more second gains further based on a level of wind noise.

4. The method of claim 3, further comprising:

determining a composite wind noise indicator associated with the wind noise; and determining the level of the wind noise based on the composite wind noise indicator.

5. The method of claim 4, wherein:

the environmental audio signal comprises a first audio signal acquired by a first microphone and a second audio signal acquired by a second microphone; and determining the composite wind noise indicator associated with the wind noise comprises:

determining a relevance factor between the first and second audio signals; and responsive to the relevance factor being below a relevance threshold, estimating an energy factor based on the first and second audio signals; and determining the composite wind noise indicator based on the relevance factor and the energy factor.

6. The method of claim 5, wherein determining the relevance factor between the first and second audio signals comprises:

determining a first energy parameter associated with the first audio signal;

determining a second energy parameter associated with the second audio signal; and determining the relevance factor based on the first and second energy parameters.

7. The method of claim 5, wherein estimating the energy factor based on the first and second audio signals comprises:

estimating a wind energy based on the first and second audio signals; and estimating the energy factor based on the wind energy.

8. The method of claim 3, wherein determining the first gain in the first sub-band from the one or more second gains further based on the level of the wind noise comprises:

responsive to the first sub-band being smaller than a frequency threshold and the level of the wind noise being smaller than or equal to a level threshold, determining the first gain to be a maximal gain among the one or more second gains;

responsive to the first sub-band being smaller than or equal to the frequency threshold and the level of the wind noise being greater than the level threshold, determining the first gain to be a minimal gain among the one or more second gains; or responsive to the first sub-band being equal to or greater than the frequency threshold, determining the first gain to be one.

9. The method of claim 1, further comprising:

determining a wind noise suppression factor based on a level of wind noise; and adjusting the set of first gains based on the wind noise suppression factor.

10. A personal sound amplification product (HAP), comprising:

one or more microphones configured to acquire an environmental audio signal;

a first filter set configured to process the environmental audio signal to generate a set of first sub-band signals in a set of first sub-bands;

a second filter set configured to process the environmental audio signal to generate a set of second sub-band signals in a set of second sub-bands;

a processor configured to determine a set of first gains for the set of first sub-band signals in the set of first sub-bands based on the set of second sub-band signals in the set of second sub-bands;

a set of gain control units configured to process the set of first sub-band signals based on the set of first gains, respectively; and a third filter set configured to synthesize the set of first sub-band signals to generate a noise-suppressed audio signal, wherein to determine the set of first gains, the processor is further configured to:

determine a set of speech presence probabilities associated with the set of second sub-band signals, respectively;

determine a set of second gains in the set of second sub-bands based on the set of speech presence probabilities, respectively; and determine the set of first gains in the set of first sub-bands based on the set of second gains in the set of second sub-bands;

wherein the set of speech presence probabilities comprises a set of posterior speech presence probabilities associated with the set of second sub-band signals; and wherein to determine the set of speech presence probabilities associated with the set of second sub-band signals, respectively, the processor is further configured to:

for each second sub-band signal in a corresponding second sub-band, determine a prior speech presence probability and a prior signal-to-noise ratio (SNR) associated with the second sub-band signal;

determine an intermediate variable determined based on the prior speech presence probability and the prior SNR; and determine a posterior speech presence probability associated with the second sub-band signal based on the prior speech presence probability, the prior SNR, and the intermediate variable.

11. The PSAP of claim 10, wherein to determine the set of first gains in the set of first sub-bands based on the set of second gains in the set of second sub-bands, the processor is further configured to:

for each first sub-band, determine, from the set of second sub-bands, one or more second sub-bands included within the first sub-band;

determine, from the set of second gains, one or more second gains in the one or more second sub-bands, respectively; and determine a first gain in the first sub-band based on the one or more second gains.

12. The PSAP of claim 11, wherein to determine the first gain in the first sub-band based on the one or more second gains, the processor is further configured to:

determine the first gain in the first sub-band from the one or more second gains further based on a level of wind noise.

13. The PSAP of claim 12, wherein the one or more microphones comprise a first microphone and a second microphone;

the environmental audio signal comprises a first audio signal acquired by the first microphone and a second audio signal acquired by the second microphone;

the processor is further configured to:

determine a relevance factor between the first and second audio signals;

estimate an energy factor based on the first and second audio signals;

determine a composite wind noise indicator based on the relevance factor and the energy factor; and determine the level of the wind noise based on the composite wind noise indicator.

14. The PSAP of claim 10, wherein to determine the set of first gains in the set of first sub-bands based on the set of second gains in the set of second sub-bands comprises, the processor is further configured to:

for each first sub-band, determine, from the set of second sub-bands, one or more second sub-bands included within the first sub-band;

determine, from the set of second gains, one or more second gains in the one or more second sub-bands, respectively; and determine a first gain in the first sub-band based on the one or more second gains.

15. The PSAP of claim 14, wherein to determine the first gain in the first sub-band based on the one or more second gains, the processor is further configured to:

determine the first gain in the first sub-band from the one or more second gains further based on a level of wind noise.

16. The PSAP of claim 15, wherein the processor is further configured to:

determine a composite wind noise indicator associated with the wind noise; and determine the level of the wind noise based on the composite wind noise indicator.

17. A system of noise suppression for a personal sound amplification product (PSAP), comprising:

a memory storing code; and a processor coupled to the memory, wherein when the code is executed, the processor is configured to:

receive a set of first sub-band signals in a set of first sub-bands, wherein the set of first sub-band signals is generated from an environmental audio signal acquired through one or more microphones;

receive a set of second sub-band signals in a set of second sub-bands, wherein the set of second sub-band signals is also generated from the environmental audio signal;

determine a set of first gains for the set of first sub-band signals in the set of first sub-bands based on the set of second sub-band signals in the set of second sub-bands; and provide the set of first gains to process the set of first sub-band signals so that a noise-suppressed audio signal is generated from the set of first sub-band signals, wherein to determine the set of first gains, the processor is further configured to:

determine a set of speech presence probabilities associated with the set of second sub-band signals, respectively;

determine a set of second gains in the set of second sub-bands based on the set of speech presence probabilities, respectively; and determine the set of first gains in the set of first sub-bands based on the set of second gains in the set of second sub-bands;

wherein to determine the set of first gains in the set of first sub-bands based on the set of second gains in the set of second sub-bands, the processor is further configured to:

for each first sub-band, determine, from the set of second sub-bands, one or more second sub-bands included within the first sub-band;

determine, from the set of second gains, one or more second gains in the one or more second sub-bands, respectively; and determine a first gain in the first sub-band based on the one or more second gains; and wherein to determine the first gain in the first sub-band based on the one or more second gains, the processor is further configured to:

determine the first gain to be a maximal gain among the one or more second gains.

18. A method of noise suppression for a personal sound amplification product (PSAP), comprising:

processing an environmental audio signal acquired through one or more microphones to generate a set of first sub-band signals in a set of first sub-bands;

processing the environmental audio signal to generate a set of second sub-band signals a set of second sub-bands;

determining a set of first gains for the set of first sub-band signals in the set of first sub-bands based on the set of second sub-band signals in the set of second sub-bands; and processing the set of first sub-band signals based on the set of first gains to generate a noise-suppressed audio signal, wherein determining the set of first gains comprises:

determining a set of speech presence probabilities associated with the set of second sub-band signals, respectively;

determining a set of second gains in the set of second sub-bands based on the set of speech presence probabilities, respectively; and determining the set of first gains in the set of first sub-bands based on the set of second gains in the set of second sub-bands;

wherein determining the set of first gains in the set of first sub-bands based on the set of second gains in the set of second sub-bands comprises:

for each first sub-band, determining, from the set of second sub-bands, one or more second sub-bands included within the first sub-band;

determining, from the set of second gains, one or more second gains in the one or more second sub-bands, respectively; and determining a first gain in the first sub-band based on the one or more second gains; and wherein determining the first gain in the first sub-band based on the one or more second gains comprises:

determining the first gain to be a maximal gain among the one or more second gains.

19. The method of claim 18, wherein the set of speech presence probabilities comprises a set of posterior speech presence probabilities associated with the set of second sub-band signals.

20. The method of claim 19, wherein determining the set of speech presence probabilities associated with the set of second sub-band signals, respectively, comprises:

for each second sub-band signal in a corresponding second sub-band, determining a prior speech presence probability and a prior signal-to-noise ratio (SNR) associated with the second sub-band signal;

determining an intermediate variable determined based on the prior speech presence probability and the prior SNR; and determining a posterior speech presence probability associated with the second sub-band signal based on the prior speech presence probability, the prior SNR, and the intermediate variable.

* * * * *